(12) United States Patent
Ko et al.

(10) Patent No.: US 11,457,476 B2
(45) Date of Patent: Sep. 27, 2022

(54) METHOD FOR TRANSMITTING OR RECEIVING SYNCHRONIZATION SIGNAL BLOCK IN UNLICENSED BAND, AND APPARATUS THEREFOR

(71) Applicant: LG Electronics Inc., Seoul (KR)

(72) Inventors: Hyunsoo Ko, Seoul (KR); Sukhyon Yoon, Seoul (KR); Seonwook Kim, Seoul (KR); Youngsub Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/422,141

(22) PCT Filed: Jan. 10, 2020

(86) PCT No.: PCT/KR2020/000525
§ 371 (c)(1),
(2) Date: Jul. 9, 2021

(87) PCT Pub. No.: WO2020/145751
PCT Pub. Date: Jul. 16, 2020

(65) Prior Publication Data
US 2022/0086904 A1    Mar. 17, 2022

Related U.S. Application Data

(60) Provisional application No. 62/842,592, filed on May 3, 2019, provisional application No. 62/791,609, filed on Jan. 11, 2019.

(30) Foreign Application Priority Data

Feb. 15, 2019    (KR) .................. 10-2019-0018247

(51) Int. Cl.
*H04W 4/00*      (2018.01)
*H04W 74/08*    (2009.01)
(Continued)

(52) U.S. Cl.
CPC ..... *H04W 74/0808* (2013.01); *H04J 11/0069* (2013.01); *H04W 48/08* (2013.01); *H04W 56/00* (2013.01)

(58) Field of Classification Search
CPC . H04W 74/0808; H04W 48/08; H04W 56/00; H04J 11/0069
See application file for complete search history.

(56) References Cited

U.S. PATENT DOCUMENTS

2017/0134960 A1   5/2017  Zhang
2018/0302182 A1  10/2018  Ly et al.
(Continued)

FOREIGN PATENT DOCUMENTS

CN    109076478    12/2018
CN    109104754    12/2018
(Continued)

OTHER PUBLICATIONS

3GPP TSG RAN WG1 Meeting #95, "Enhancements to NR DL signals and channels for unlicensed operation" (R1-1812480) Nov. 12-16, 2018 (Year: 2018).*
(Continued)

*Primary Examiner* — Siren Wei
(74) *Attorney, Agent, or Firm* — Fish & Richardson P.C.

(57) ABSTRACT

The present disclosure provides a method for receiving a synchronization signal/physical broadcast channel (SS/PBCH) block by a terminal in an unlicensed band. Particularly, the method may comprise: receiving an SS/PBCH block including an SS and a PBCH; detecting an index of a demodulation reference signal (DMRS) sequence for the PBCH; and on the basis of the index of the DRMS sequence, acquiring information relating to a time when an index of the SS/PBCH block and the SS/PBCH block are received, wherein the number of indices of the SS/PBCH block is
(Continued)

smaller than or equal to the number of indices of the DMRS sequence, and the indices of the SS/PBCH block are cyclically mapped to the indices of the DMRS sequence.

13 Claims, 21 Drawing Sheets

(51) Int. Cl.
  *H04J 11/00* (2006.01)
  *H04W 48/08* (2009.01)
  *H04W 56/00* (2009.01)

(56) References Cited

U.S. PATENT DOCUMENTS

| | | | | |
|---|---|---|---|---|
| 2019/0013917 | A1* | 1/2019 | Nam | H04J 11/0083 |
| 2019/0081827 | A1* | 3/2019 | Ly | H04J 11/0069 |
| 2019/0349885 | A1* | 11/2019 | Koskela | H04W 72/085 |
| 2020/0359427 | A1* | 11/2020 | Oh | H04J 11/0076 |

FOREIGN PATENT DOCUMENTS

| | | |
|---|---|---|
| CN | 109150446 | 1/2019 |
| KR | 1020180044914 | 5/2018 |
| KR | 1020180069002 | 6/2018 |
| KR | 1020180101339 | 9/2018 |
| KR | 1020180109894 | 10/2018 |
| KR | 1020180135871 | 12/2018 |
| KR | 1020180137419 | 12/2018 |
| WO | WO2017035238 | 3/2017 |

OTHER PUBLICATIONS

3GPP TSG RAN WG1 Meeting #95 "Initial access and mobility for NR unlicensed operation" (R1-1812561) Nov. 12-16, 2018 (Year: 2018).*

International Search Report and Written Opinion in International Appln. No. PCT/KR2020/000525, dated May 21, 2020, 17 pages (with English translation).

LG Electronics, "Initial access and mobility for NR unlicensed operation," R1-1808508, 3GPP TSG RAN WG1 Meeting #94, Gothenburg, Sweden, dated Aug. 20-24, 2018, 12 pages.

LG Electronics, "NR-PBCH Design," R1-1707590, 3GPP TSG RAN WG1 Meeting #89, Hangzhou, P.R. China, dated May 15-19, 2017, 14 pages.

Office Action in Korean Appln. No. 10-2020-0003914, dated Aug. 27, 2020, 7 pages (with English translation).

Office Action in Korean Appln. No. 10-2020-0003914, dated Mar. 16, 2020, 9 pages (with English translation).

Office Action in Korean Appln. No. 10-2020-0003914, dated Oct. 30, 2020, 12 pages (with English translation).

Extended European Search Report in European Appln. No. 20738146.8, dated Dec. 23, 2021, 12 pages.

Office Action in Chinese Appln. No. 202080008946.6, dated Mar. 15, 2022, 11 pages (with English translation).

* cited by examiner

FIG. 1
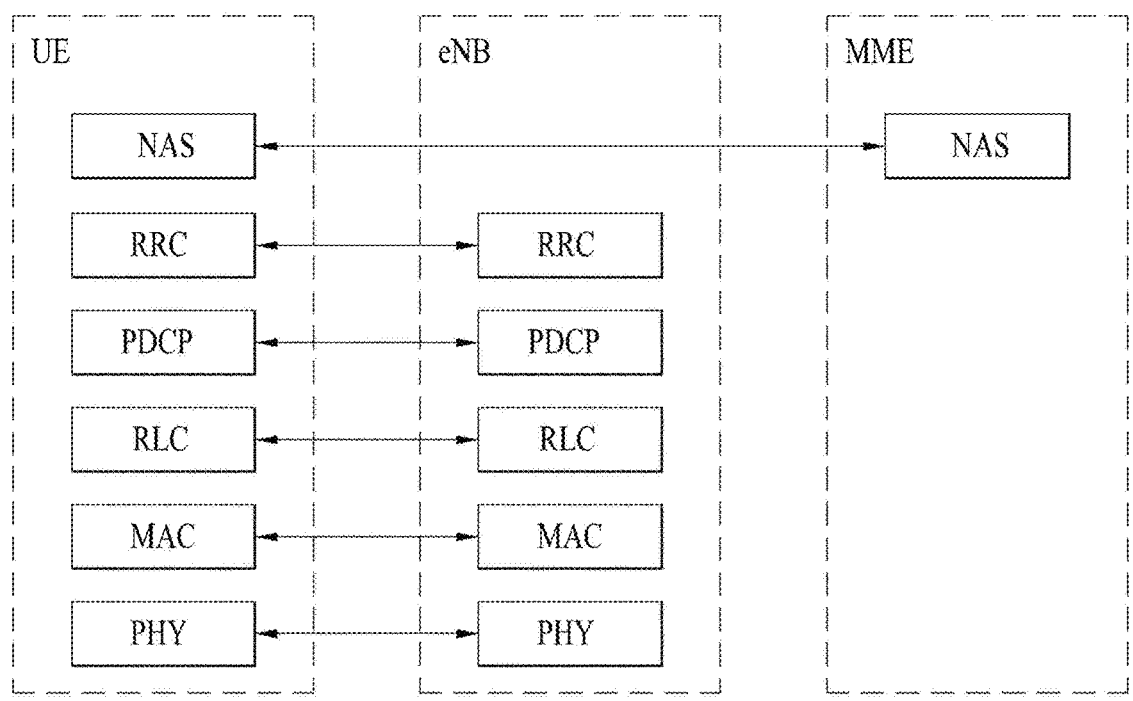
(A) CONTROL-PLANE PROTOCOL STACK
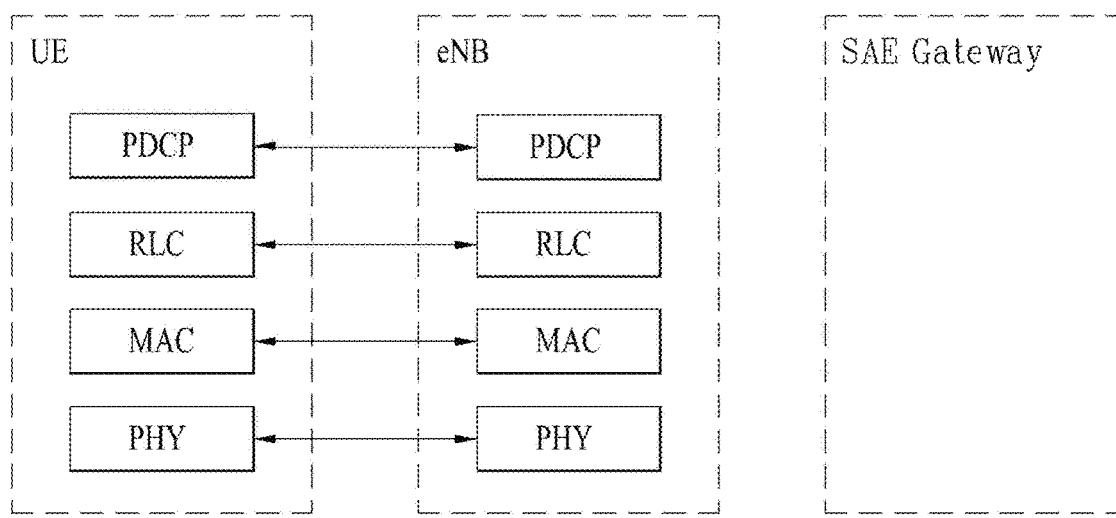
(B) USER-PLANE PROTOCOL STACK

METHOD FOR TRANSMITTING OR RECEIVING SYNCHRONIZATION SIGNAL BLOCK IN UNLICENSED BAND, AND APPARATUS THEREFOR

CROSS-REFERENCE TO RELATED APPLICATIONS

This application is a National Stage application under 35 U.S.C. § 371 of International Application No. PCT/KR2020/000525, filed on Jan. 10, 2020, which claims the benefit of U.S. Provisional Application No. 62/842,592, filed on May 3, 2019, Korean Application No. 10-2019-0018247, filed on Feb. 15, 2019, and U.S. Provisional Application No. 62/791,609, filed on Jan. 11, 2019. The disclosures of the prior applications are incorporated by reference in their entirety.

TECHNICAL FIELD

The present disclosure relates to a method of transmitting and receiving a synchronization signal block in an unlicensed band and apparatus therefor, and more particularly, to a method of obtaining information on a time at which a synchronization signal block is transmitted in an unlicensed band and apparatus therefor.

BACKGROUND

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

SUMMARY

The object the present disclosure is to provide a method of transmitting and receiving a synchronization signal block in an unlicensed band and apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

In an aspect of the present disclosure, a method of receiving a synchronization signal/physical broadcast channel (SS/PBCH) block by a user equipment (UE) in an unlicensed band is provided. The method may include: receiving the SS/PBCH block including a synchronization signal (SS) and a physical broadcast channel (PBCH); detecting an index of a demodulation reference signal (DMRS) sequence for the PBCH; and obtaining an index of the SS/PBCH block and information about a time at which the SS/PBCH block is received, based on the index of the DMRS sequence. The number of indices of the SS/PBCH block may be less than or equal to the number of indices of the DMRS sequence, and the indices of the SS/PBCH block may be cyclically mapped to the indices of the DMRS sequence.

The number of indices of the SS/PBCH block may be equal to an interval between SS/PBCH blocks in which a quasi co-location (QCL) assumption is allowed.

After the indices of the SS/PBCH block and the indices of the DMRS sequence are cyclically mapped integer times to candidate positions in which transmission of the SS/PBCH block is allowed within a half frame, the indices of the SS/PBCH block and the indices of the DMRS sequence may be cyclically mapped to remaining candidate positions by the number of remaining candidate positions.

The number of candidate positions in which transmission of the SS/PBCH block is allowed within a half frame may be based on a subcarrier spacing.

Bits related to positions of DMRS sequence groups obtained by grouping DMRS sequences mapped to candidate positions in which transmission of the SS/PBCH block is allowed within a half frame by the number of DMRS sequences may be included in a payload of the PBCH.

The number of bits related to the positions of the DMRS sequence groups may be determined based on a subcarrier spacing.

The UE may be configured to communicate with at least one of a UE other than the UE, a network, a base station, or an autonomous driving vehicle.

In another aspect of the present disclosure, an apparatus configured to receive an SS/PBCH block in an unlicensed band is provided. The apparatus may include: at least one processor; and at least one memory operably connected to the at least one processor and configured to store instructions that, when executed, cause the at least one processor to perform operations including: receiving the SS/PBCH block including an SS and a PBCH; detecting an index of a DMRS sequence for the PBCH; and obtaining an index of the SS/PBCH block and information about a time at which the SS/PBCH block is received, based on the index of the DMRS sequence. The number of indices of the SS/PBCH block may be less than or equal to the number of indices of the DMRS sequence, and the indices of the SS/PBCH block may be cyclically mapped to the indices of the DMRS sequence.

The number of indices of the SS/PBCH block may be equal to an interval between SS/PBCH blocks in which a QCL assumption is allowed.

After the indices of the SS/PBCH block and the indices of the DMRS sequence are cyclically mapped integer times to candidate positions in which transmission of the SS/PBCH block is allowed within a half frame, the indices of the SS/PBCH block and the indices of the DMRS sequence may be cyclically mapped to remaining candidate positions by the number of remaining candidate positions.

The number of candidate positions in which transmission of the SS/PBCH block is allowed within a half frame may be based on a subcarrier spacing.

Bits related to positions of DMRS sequence groups obtained by grouping DMRS sequences mapped to candidate positions in which transmission of the SS/PBCH block is allowed within a half frame by the number of DMRS sequences may be included in a payload of the PBCH.

The number of bits related to the positions of the DMRS sequence groups may be determined based on a subcarrier spacing.

The apparatus may be configured to communicate with a UE, a network, a base station, or an autonomous driving vehicle.

According to the present disclosure, the transmission position of a synchronization signal block and timing information thereon may be accurately obtained.

It will be appreciated by persons skilled in the art that the effects that could be achieved with the present disclosure are not limited to what has been particularly described hereinabove and other advantages of the present disclosure will be more clearly understood from the following detailed description.

BRIEF DESCRIPTION OF THE DRAWINGS

FIG. 1 is a diagram illustrating the control-plane and user-plane architecture of radio interface protocols between a user equipment (UE) and an evolved UMTS terrestrial radio access network (E-UTRAN) in conformance to a 3rd generation partnership project (3GPP) radio access network standard.

FIGS. 18 to 23 are diagrams illustrating particular embodiments of mapping the index of an SS/PBCH block in an unlicensed band according to the present disclosure.

DETAILED DESCRIPTION

Figure 2:
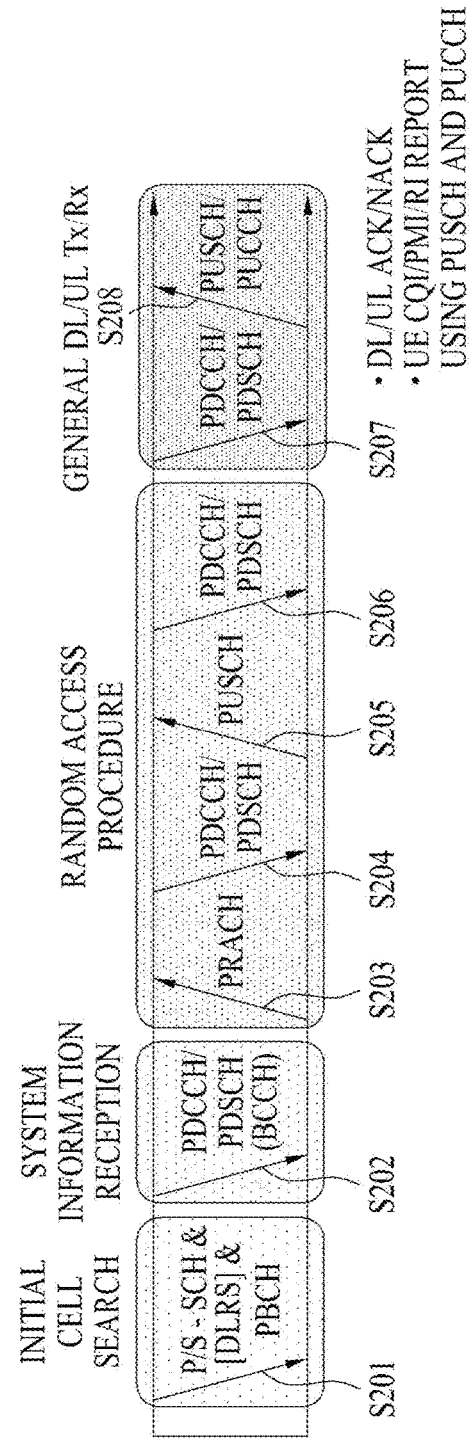
FIG. 2 is a diagram illustrating physical channels and a general signal transmission method using the physical channels in a 3GPP system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup may be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

The use of an ultra-high frequency band, that is, a millimeter frequency band at or above 6 GHz is under consideration in the NR system to transmit data in a wide frequency band, while maintaining a high transmission rate for multiple users. The 3GPP calls this system NR. In the present disclosure, the system will also be referred to as an NR system.

The NR system adopts the OFDM transmission scheme or a similar transmission scheme. Specifically, the NR system may use OFDM parameters different from those in LTE. Further, the NR system may follow the legacy LTE/LTE-A numerology but have a larger system bandwidth (e.g., 100 MHz). Further, one cell may support a plurality of numerologies in the NR system. That is, UEs operating with different numerologies may coexist within one cell.

Figure 3:
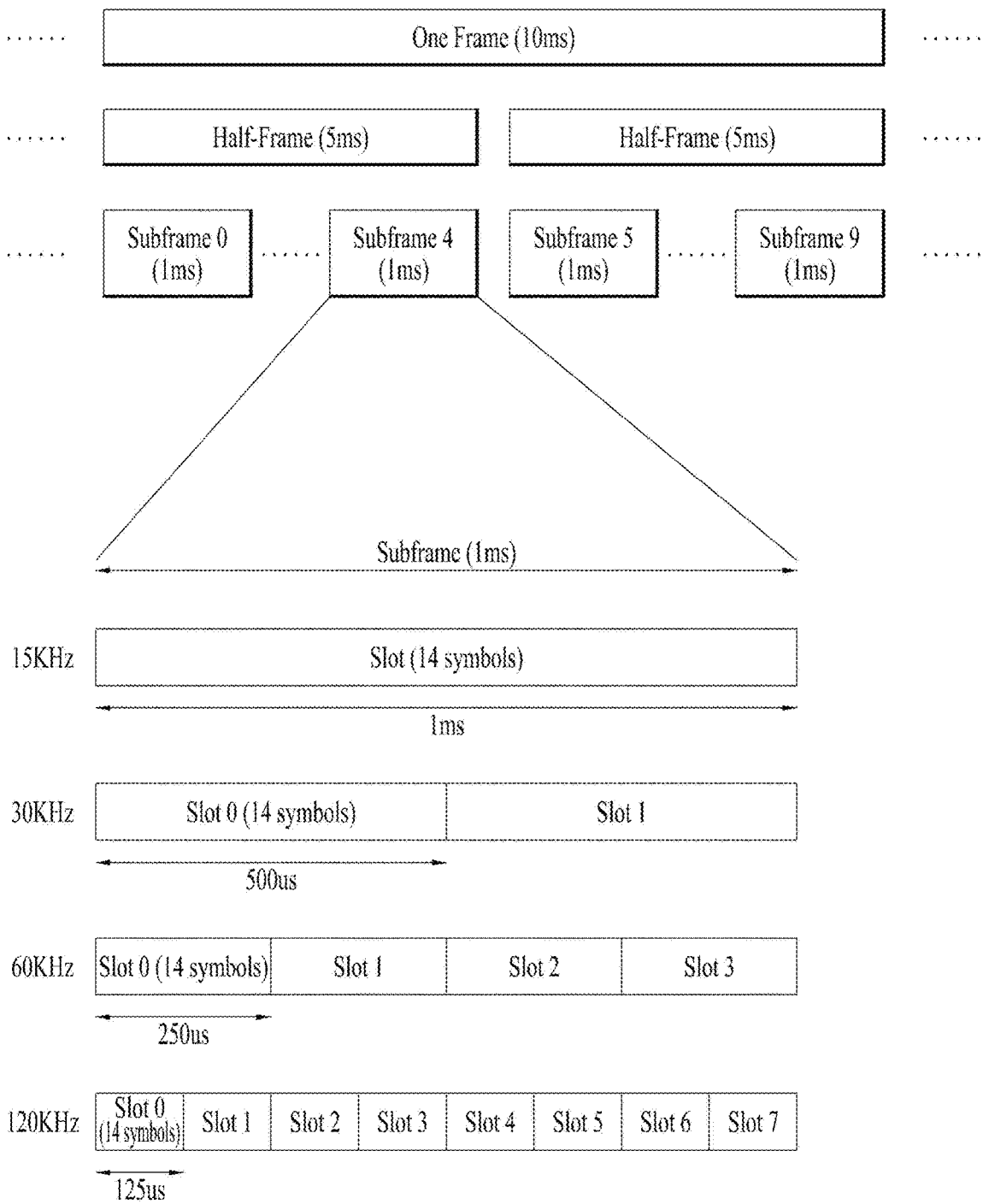
FIGS. 3, 4 and 5 are diagrams illustrating structures of a radio frame and slots used in a new RAT (NR) system.

FIG. 3 illustrates a structure of a radio frame used in NR.

In NR, UL and DL transmissions are configured in frames. The radio frame has a length of 10 ms and is defined as two 5-ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

[Table 1] illustrates that the number of symbols per slot, the number of slots per frame, and the number of slots per subframe vary according to the SCS when the normal CP is used.

TABLE 1

| SCS ($15 * 2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot
* $N^{frame,u}_{slot}$: Number of slots in a frame
* $N^{subframe,u}_{slot}$: Number of slots in a subframe

[Table 2] illustrates that the number of symbols per slot, the number of slots per frame, and the number of slots per subframe vary according to the SCS when the extended CP is used.

TABLE 2

| SCS ($15 * 2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells.

Figure 4:
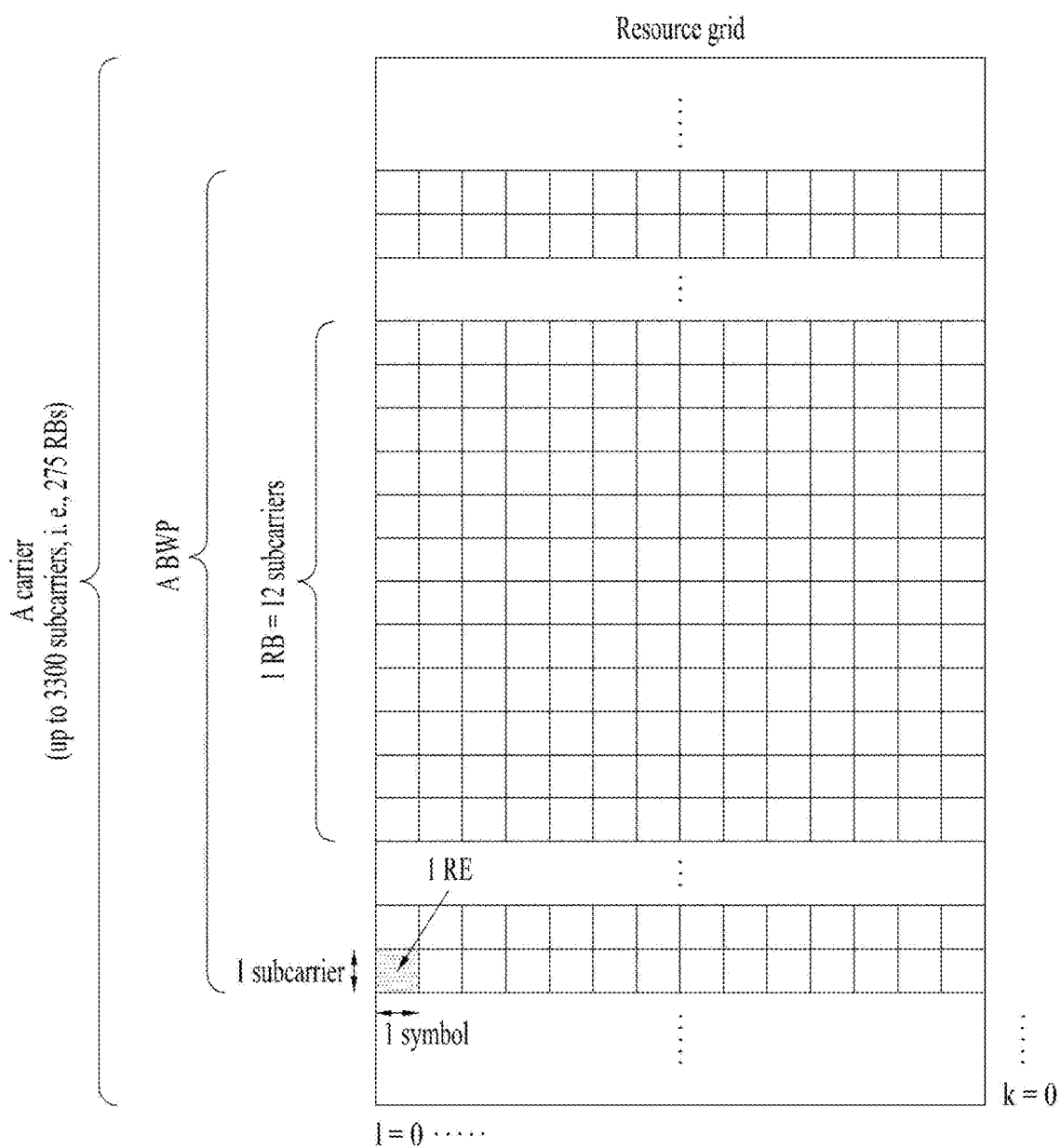

FIG. 4 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 5:
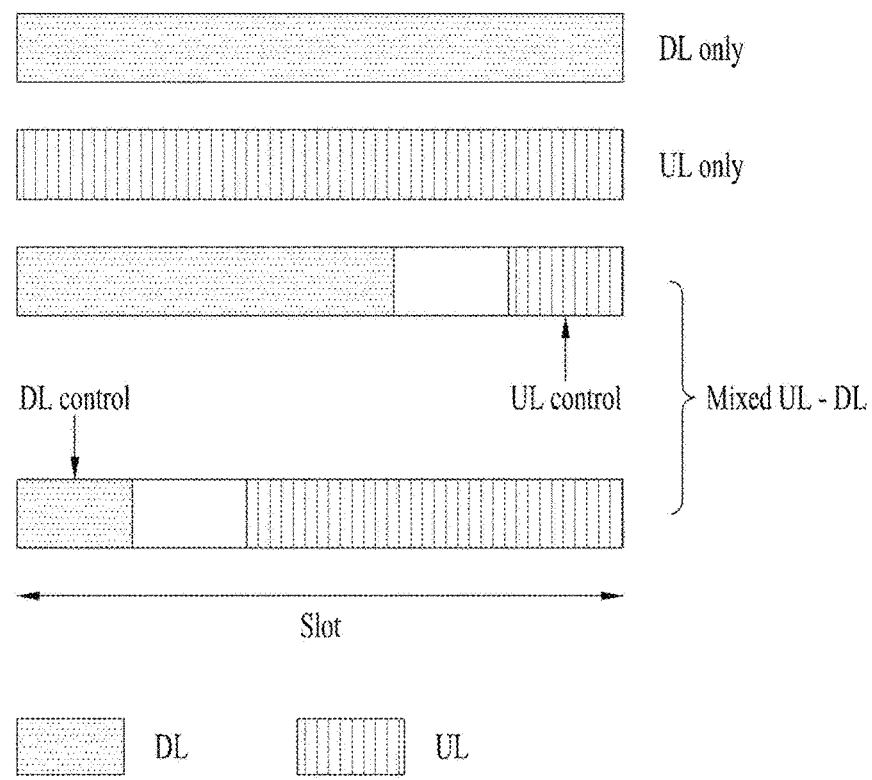

FIG. 5 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

Figure 6:
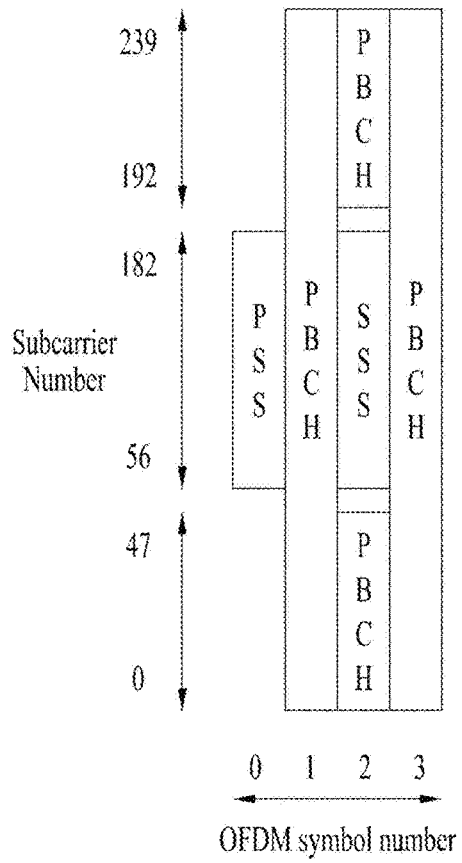
FIGS. 6, 7, 8, 9, 10 and 11 are diagrams illustrating the composition of a synchronization signal/physical broadcast channel (SS/PBCH) block and a method of transmitting an SS/PBCH block.

FIG. 6 illustrates an SSB structure. The UE may perform cell search, system information acquisition, beam alignment for initial access, DL measurement, and so on based on an SSB. The term SSB is used interchangeably with synchronization signal/physical broadcast channel (SS/PBCH) block.

Referring to FIG. 6, an SSB is composed of a PSS, an SSS, and a PBCH. The SSB includes four consecutive OFDM symbols. The PSS, the PBCH, the SSS/PBCH, and the PBCH are transmitted on the respective OFDM symbols. Each of the PSS and the SSS includes one OFDM symbol and 127 subcarriers, and the PBCH includes 3 OFDM symbols and 576 subcarriers. Polar coding and quadrature phase shift keying (QPSK) are applied to the PBCH. The PBCH includes data REs and demodulation reference signal (DMRS) REs in each OFDM symbol. There are three DMRS REs per RB, with three data REs between every two adjacent DMRS REs.

Cell Search

The cell search refers to a procedure in which the UE obtains time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as described in Table 3 below.

TABLE 3

| | Type of Signals | Operations |
|---|---|---|
| $1^{st}$ step | PSS | * SS/PBCH block (SSB) symbol timing acquisition<br>* Cell ID detection within a cell ID group (3 hypothesis) |
| $2^{nd}$ Step | SSS | * Cell ID group detection (336 hypothesis) |
| $3^{rd}$ Step | PBCH DMRS | * SSB index and Half frame (HF) index (Slot and frame boundary detection) |
| $4^{th}$ Step | PBCH | * Time information (80 ms, System Frame Number (SFN), SSB index, HF)<br>* Remaining Minimum System Information (RMSI) Control resource set (CORESET)/Search space configuration |
| $5^{th}$ Step | PDCCH and PDSCH | * Cell access information<br>* RACH configuration |

Figure 7:
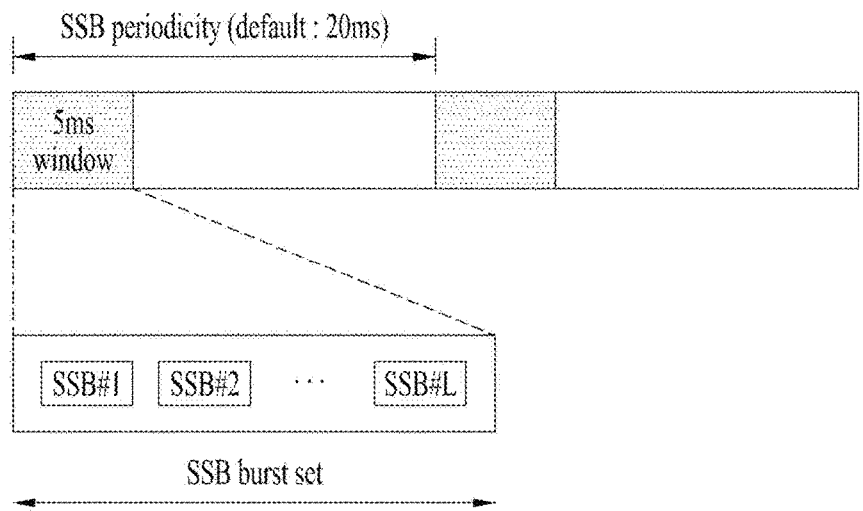

FIG. 7 illustrates SSB transmission.

Referring to FIG. 7, an SSB is periodically transmitted according to the SSB periodicity. The basic SSB periodicity assumed by the UE in the initial cell search is defined as 20 ms. After the cell access, the SSB periodicity may be set to one of {5 ms, 10 ms, 20 ms, 40 ms, 80 ms, 160 ms} by the network (e.g., the BS). An SSB burst set may be configured at the beginning of an SSB period. The SSB burst set may be configured with a 5-ms time window (i.e., half-frame), and an SSB may be repeatedly transmitted up to L times within the SS burst set. The maximum number of transmissions of the SSB, L may be given according to the frequency band of a carrier as follows. One slot includes up to two SSBs.

For frequency range up to 3 GHz, L=4
For frequency range from 3 GHz to 6 GHz, L=8
For frequency range from 6 GHz to 52.6 GHz, L=64

The time position of an SSB candidate in the SS burst set may be defined according to the SCS as follows. The time positions of SSB candidates are indexed as (SSB indexes) 0 to L−1 in temporal order within the SSB burst set (i.e., half-frame).

Case A—15-kHz SCS: The indexes of the first symbols of candidate SSBs are given as $\{2, 8\}+14*n$ where n=0, 1 for a carrier frequency equal to or lower than 3 GHz, and n=0, 1, 2, 3 for a carrier frequency of 3 GHz to 6 GHz.

Case B—30-kHz SCS: The indexes of the first symbols of candidate SSBs are given as $\{4, 8, 16, 20\}+28*n$ where n=0 for a carrier frequency equal to or lower than 3 GHz, and n=0, 1 for a carrier frequency of 3 GHz to 6 GHz.

Case C—30-kHz SCS: The indexes of the first symbols of candidate SSBs are given as $\{2, 8\}+14*n$ where n=0, 1 for a carrier frequency equal to or lower than 3 GHz, and n=0, 1, 2, 3 for a carrier frequency of 3 GHz to 6 GHz.

Case D—120-kHz SCS: The indexes of the first symbols of candidate SSBs are given as $\{4, 8, 16, 20\}+28*n$ where n=0, 1, 2, 3, 5, 6, 7, 8, 10, 11, 12, 13, 15, 16, 17, 18 for a carrier frequency above 6 GHz.

Case E—240-kHz SCS: The indexes of the first symbols of candidate SSBs are given as $\{8, 12, 16, 20, 32, 36, 40, 44\}+56*n$ where n=0, 1, 2, 3, 5, 6, 7, 8 for a carrier frequency above 6 GHz.

Figure 8:
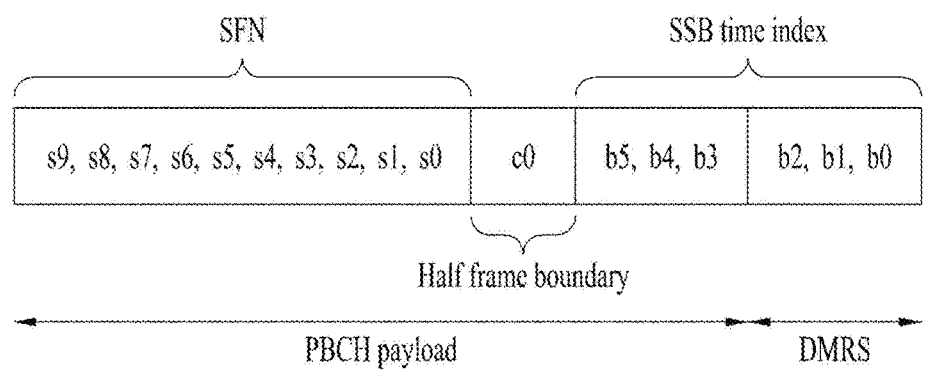

FIG. 8 illustrates exemplary acquisition of information about DL time synchronization at a UE.

Referring to FIG. 8, the UE may acquire DL synchronization by detecting an SSB. The UE may identify the structure of an SSB burst set based on the index of the detected SSB, and thus detect a symbol/slot/half-frame boundary. The number of a frame/half-frame to which the detected SSB belongs may be identified by SFN information and half-frame indication information.

Specifically, the UE may acquire 10-bit SFN information, s0 to s9 from a PBCH. 6 bits of the 10-bit SFN information is acquired from a master information block (MIB), and the remaining 4 bits is acquired from a PBCH transport block (TB).

Subsequently, the UE may acquire 1-bit half-frame indication information c0. If a carrier frequency is 3 GH or below, the half-frame indication information may be signaled implicitly by a PBCH DMRS. The PBCH DMRS indicates 3-bit information by using one of 8 PBCH DMRS sequences. Therefore, if L=4, the remaining one bit except for two bits indicating an SSB index in the 3-bit information which may be indicated by 8 PBCH DMRS sequences may be used for half-frame indication.

Finally, the UE may acquire an SSB index based on the DMRS sequence and the PBCH payload. SSB candidates are indexed from 0 to L−1 in a time order within an SSB burst set (i.e., half-frame). If L=8 or 64, three least significant bits (LSBs) b0 to b2 of the SSB index may be indicated by 8 different PBCH DMRS sequences. If L=64, three most significant bits (MSBs) b3 to b5 of the SSB index is indicated by the PBCH. If L=2, two LSBs b0 and b1 of an SSB index may be indicated by 4 different PBCH DMRS sequences. If L=4, the remaining one bit b2 except for two bits indicating an SSB index in 3-bit information which may be indicated by 8 PBCH DMRS sequences may be used for half-frame indication.

System Information Acquisition

Figure 9:
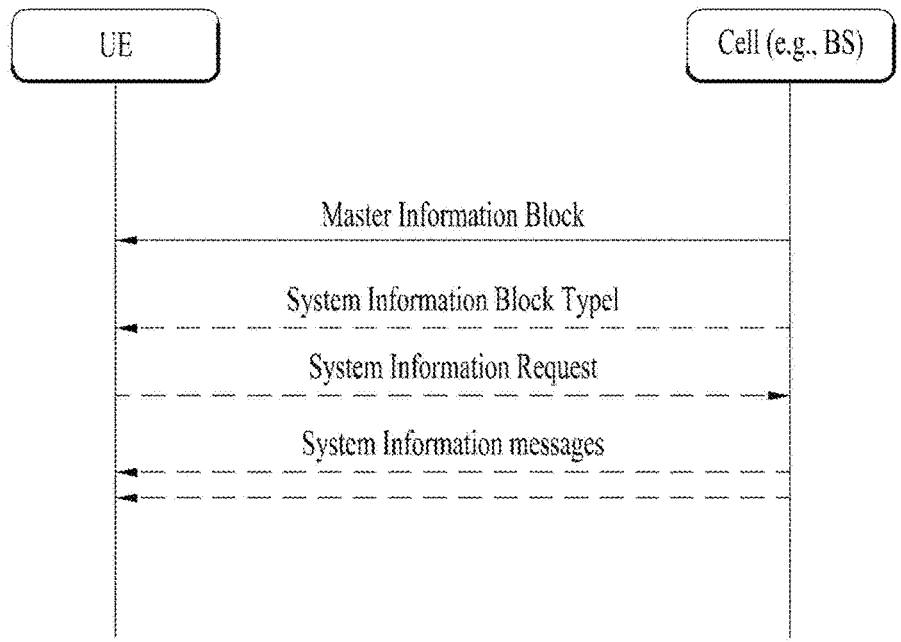

FIG. 9 illustrates a system information (SI) acquisition procedure. The UE may obtain access stratum (AS)-/non-access stratum (NAS)-information in the SI acquisition procedure. The SI acquisition procedure may be applied to UEs in RRC_IDLE, RRC_INACTIVE, and RRC_CONNECTED states.

SI is divided into a master information block (MIB) and a plurality of system information blocks (SIBs). The MIB and the plurality of SIBs are further divided into minimum SI and other SI. The minimum SI may include the MIB and systemInformationBlock1 (SIB1), carrying basic information required for initial access and information required to obtain the other SI. SIB1 may also be referred to as remaining minimum system information (RMSI). For details, the following may be referred to.

The MIB includes information/parameters related to reception of SIB1 and is transmitted on the PBCH of an SSB. The UE assumes that a half-frame including an SSB is repeated every 20 ms during initial cell selection. The UE may determine from the MIB whether there is any control resource set (CORESET) for a Type0-PDCCH common search space. The Type0-PDCCH common search space is a kind of PDCCH search space and used to transmit a PDCCH that schedules an SI message. In the presence of a Type0-PDCCH common search space, the UE may determine (1) a plurality of contiguous RBs and one or more consecutive symbols included in a CORESET, and (ii) a PDCCH occasion (e.g., a time-domain position at which a PDCCH is to be received), based on information (e.g., pdcch-ConfigSIB1) included in the MIB. In the absence of a Type0-PDCCH common search space, pdcch-ConfigSIB1 provides information about a frequency position at which the SSB/SIB1 exists and information about a frequency range without any SSB/SIB1.

SIB1 includes information related to availability and scheduling (e.g., a transmission periodicity and an SI-window size) of the remaining SIBs (hereinafter, referred to as SIBx where x is an integer equal to or larger than 2). For example, SIB1 may indicate whether SIBx is broadcast periodically or in an on-demand manner upon UE request. If SIBx is provided in the on-demand manner, SIB1 may include information required for the UE to transmit an SI request. A PDCCH that schedules SIB1 is transmitted in the Type0-PDCCH common search space, and SIB1 is transmitted on a PDSCH indicated by the PDCCH.

SIBx is included in an SI message and transmitted on a PDSCH. Each SI message is transmitted within a periodic time window (i.e., SI-window).

Beam Alignment

Figure 10:
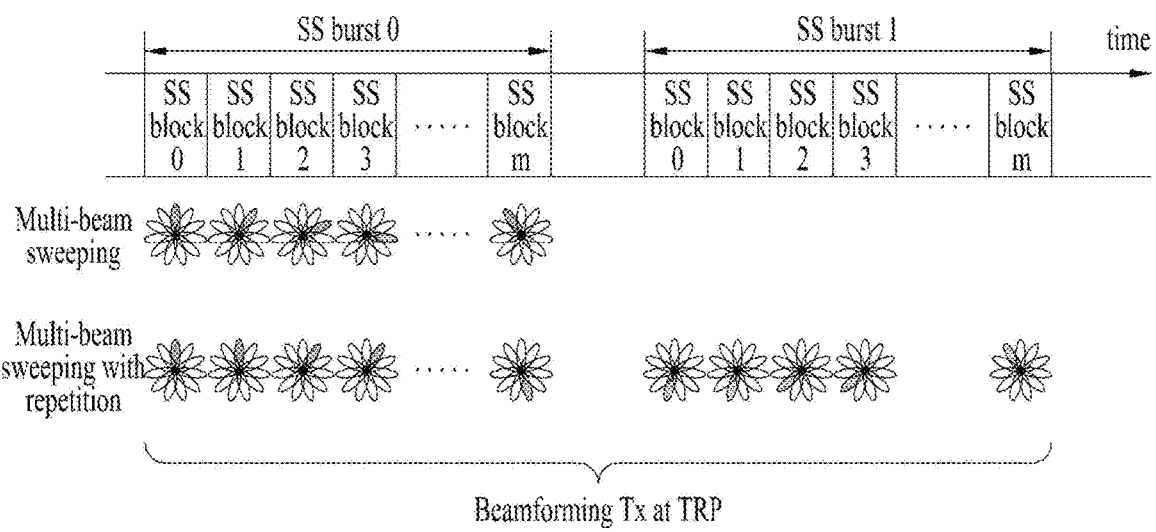

FIG. 10 illustrates exemplary multi-beam transmission of SSBs.

Beam sweeping refers to changing the beam (direction) of a wireless signal over time at a transmission reception point (TRP) (e.g., a BS/cell) (hereinafter, the terms beam and beam direction are interchangeably used). Referring to FIG. 10, an SSB may be transmitted periodically by beam sweeping. In this case, SSB indexes are implicitly linked to SSB beams. An SSB beam may be changed on an SSB (index) basis or on an SS (index) group basis. In the latter, the same SSB beam is maintained in an SSB (index) group. That is, the transmission beam direction of an SSB is repeated for a plurality of successive SSBs. The maximum allowed transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range of up to 3 GHz, maximum number of beams=4

For frequency range from 3 GHz to 6 GHz, maximum number of beams=8

For frequency range from 6 GHz to 52.6 GHz, maximum number of beams=64

Without multi-beam transmission, the number of SSB beams is 1.

When the UE attempts initial access to the BS, the UE may align beams with the BS based on an SSB. For example, the UE performs SSB detection and then identifies a best SSB. Subsequently, the UE may transmit an RACH preamble in PRACH resources linked/corresponding to the index (i.e., beam) of the best SSB. The SSB may also be used for beam alignment between the BS and the UE even after the initial access.

Channel Estimation and Rate-Matching

Figure 11:
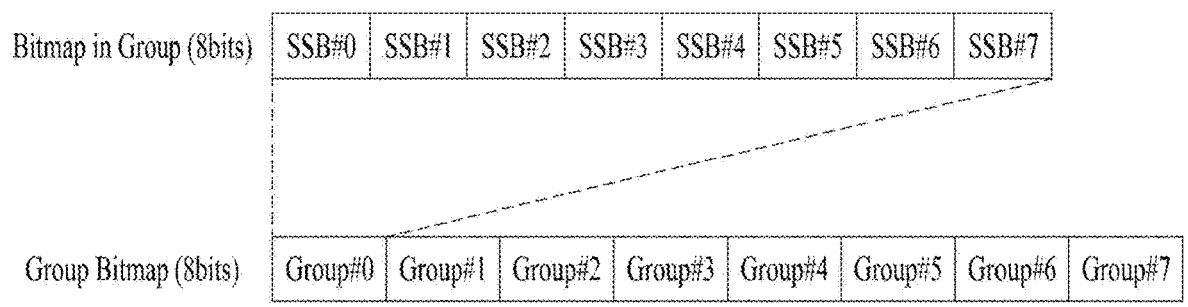

FIG. 11 illustrates an exemplary method of indicating actually transmitted SSBs, SSB_tx.

Up to L SSBs may be transmitted in an SSB burst set, and the number and positions of actually transmitted SSBs may be different for each BS or cell. The number and positions of actually transmitted SSBs are used for rate-matching and measurement, and information about actually transmitted SSBs is indicated as follows.

If the information is related to rate matching, the information may be indicated by UE-specific RRC signaling or RMSI. The UE-specific RRC signaling includes a full bitmap (e.g., of length L) for frequency ranges below and above 6 GHz. The RMSI includes a full bitmap for a frequency range below 6 GHz and a compressed bitmap for a frequency range above 6 GHz, as illustrated. Specifically, the information about actually transmitted SSBs may be indicated by a group-bitmap (8 bits)+an in-group bitmap (8 bits). Resources (e.g., REs) indicated by the UE-specific RRC signaling or the RMSI may be reserved for SSB transmission, and a PDSCH and/or a PUSCH may be rate-matched in consideration of the SSB resources.

If the information is related to measurement, the network (e.g., BS) may indicate an SSB set to be measured within a measurement period, when the UE is in RRC connected mode. The SSB set may be indicated for each frequency layer. Without an indication of an SSB set, a default SSB set is used. The default SSB set includes all SSBs within the measurement period. An SSB set may be indicated by a full bitmap (e.g., of length L) in RRC signaling. When the UE is in RRC idle mode, the default SSB set is used.

In the NR system, a massive multiple input multiple output (MIMO) environment in which the number of transmission/reception (Tx/Rx) antennas is significantly increased may be under consideration. That is, as the massive MIMO environment is considered, the number of Tx/Rx antennas may be increased to a few tens or hundreds. The NR system supports communication in an above 6 GHz band, that is, a millimeter frequency band. However, the millimeter frequency band is characterized by the frequency property that a signal is very rapidly attenuated according to a distance due to the use of too high a frequency band. Therefore, in an NR system operating at or above 6 GHz, beamforming (BF) is considered, in which a signal is transmitted with concentrated energy in a specific direction, not omni-directionally, to compensate for rapid propagation attenuation. Accordingly, there is a need for hybrid BF with analog BF and digital BF in combination according to a position to which a BF weight vector/precoding vector is applied, for the purpose of increased performance, flexible resource allocation, and easiness of frequency-wise beam control in the massive MIMO environment.

Figure 12:
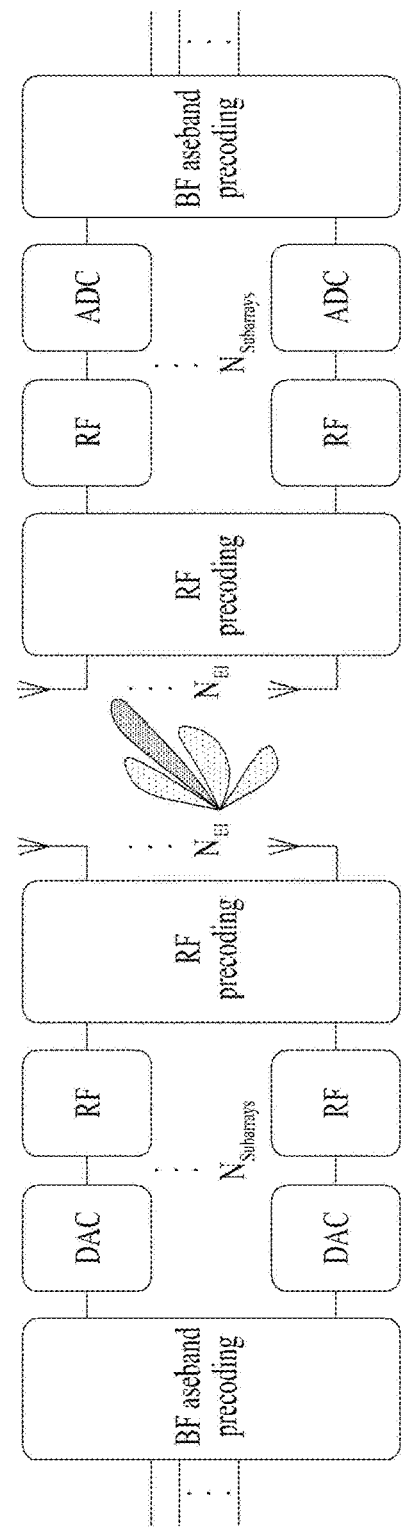
FIG. 12 is a diagram illustrating analog beamforming in the NR system.

FIG. 12 is a block diagram illustrating an exemplary transmitter and receiver for hybrid BF.

To form a narrow beam in the millimeter frequency band, a BF method is mainly considered, in which a BS or a UE transmits the same signal through multiple antennas by applying appropriate phase differences to the antennas and thus increasing energy only in a specific direction. Such BF methods include digital BF for generating a phase difference for digital baseband signals, analog BF for generating phase differences by using time delays (i.e., cyclic shifts) for modulated analog signals, and hybrid BF with digital BF and analog beamforming in combination. Use of a radio frequency (RF) unit (or transceiver unit (TXRU)) for antenna element to control transmission power and phase control on antenna element basis enables independent BF for each frequency resource. However, installing TXRUs in all of about 100 antenna elements is less feasible in terms of cost. That is, a large number of antennas are required to compensate for rapid propagation attenuation in the millimeter frequency, and digital BF needs as many RF components (e.g., digital-to-analog converters (DACs), mixers, power amplifiers, and linear amplifiers) as the number of antennas. As a consequence, implementation of digital BF in the millimeter frequency band increases the prices of communication devices. Therefore, analog BF or hybrid BF is considered, when a large number of antennas are needed as is the case with the millimeter frequency band. In analog BF, a plurality of antenna elements are mapped to a single TXRU and a beam direction is controlled by an analog phase shifter. Because only one beam direction is generated across a total band in analog BF, frequency-selective BF may not be achieved with analog BF. Hybrid BF is an intermediate form of digital BF and analog BF, using B RF units fewer than Q antenna elements. In hybrid BF, the number of beam directions available for simultaneous transmission is limited to B or less, which depends on how B RF units and Q antenna elements are connected.

Quasi Co-Location (QCL)

A UE may receive a list including up to M transmission configuration indicator (TCI) state configurations to decode a PDSCH according to a detected PDCCH with DCI intended for the UE and a given serving cell. In this case, M depends on the capability of the UE.

Each TCI state includes a parameter for configuring a QCL relationship between one or two DL RSs and DMRS ports of the PDSCH. The QCL relationship is configured with a RRC parameter qcl-Type1 for the first DL RS and a qcl-Type2 for the second DL RS (if configured).

The QCL type related to each DL RS may be given by a parameter 'qcl-Type' in QCL-Info and may have one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is a specific non-zero power (NZP) CSI-RS, it may be indicated/configured that related NZP CSI-RS antenna ports are quasi co-located (QCLed) with a specific TRS in terms of QCL-Type A and QCLed with a specific SSB in terms of QCL-Type D. Upon receiving the above indication/configuration, the UE may receive the corresponding NZP CSI-RS based on Doppler and delay values measured for the QCL-TypeA TRS. In this case, the UE may apply a reception beam used to receive the QCL-TypeD SSB to the reception of the corresponding NZP CSI-RS.

Beam Failure Recovery (BFR) Process

In beamformed systems, radio link failure (RLF) may frequently occur due to the rotation, movement or beamforming blockage of a UE. Accordingly, NR supports BFR to prevent the frequent occurrence of the RLF. The BFR is similar to a radio link failure recovery procedure and may be supported when the UE knows new candidate beams.

For beam failure detection, the BS may configure beam failure detection RSs for the UE, and the UE may declare beam failure when the number of beam failure indications from the physical layer of the UE reaches a threshold configured by RRC signaling from the BS within a period configured by the corresponding RRC signaling.

After detecting the beam failure, the UE may trigger beam failure recovery by initiating a random access procedure on a PCell and perform the beam failure recovery by selecting a suitable beam (if the BS provides random access resources dedicated to certain beams, the UE prioritizes the resources). When the random access procedure is completed, the beam failure recovery may be regarded to be completed.

Radio Resource Management (RRM) Measurement

Wireless communication systems support RRM operation including power control, scheduling, cell search, cell reselection, handover, radio link or connection monitoring, and connection establishment and re-establishment. In this case, a serving cell may request a UE to send RRM measurement information corresponding to a measurement value for performing the RRM operation. In particular, the UE may measure and report cell search information, reference signal received power (RSRP), reference signal received quality (RSRQ), and so on for each cell. Specifically, the UE may receive 'measConfig' for RRM measurement from the serving cell through higher layer signaling and then measure the RSRP or RSRQ based on information in 'measConfig'. The definitions of the RSRP, RSRQ, and RSSI in the NR system are defined as follows in TS 38.215.

RSRP: RSRP is defined as the linear average over the power contributions ([W]) of the resource elements (REs) for cell-specific reference signals (CRSs) or channel state information reference signals (CSI-RSs) transmitted in a measurement frequency bandwidth. In NR, the RSRP may be defined as the linear average over the power contributions ([W]) of the REs for secondary synchronization signals (SSSs).

For RSRP determination, CRS R0 according TS 36.211 may be used. In some cases, CRS R1 may be additionally used to improve reliability. The reference point for the RSRP should be an antenna connector of a UE. If receiver diversity is in use, a reported RSRP value shall not be lower than the RSRP of anyone of individual diversities.

RSRQ: RSRQ is defined as (N*RSRP)/(E-UTRA/NR carrier RSSI or CSI-RSSI), where N is the number of RBs in a E-UTRA/NR carrier RSSI measurement bandwidth or a CSI-RSSI measurement bandwidth. In this case, the measurement of 'N*RSRP' and the measurement of 'E-UTRA carrier RSSI or CSI-RSSI' may be made over the same RB set.

Figure 13:
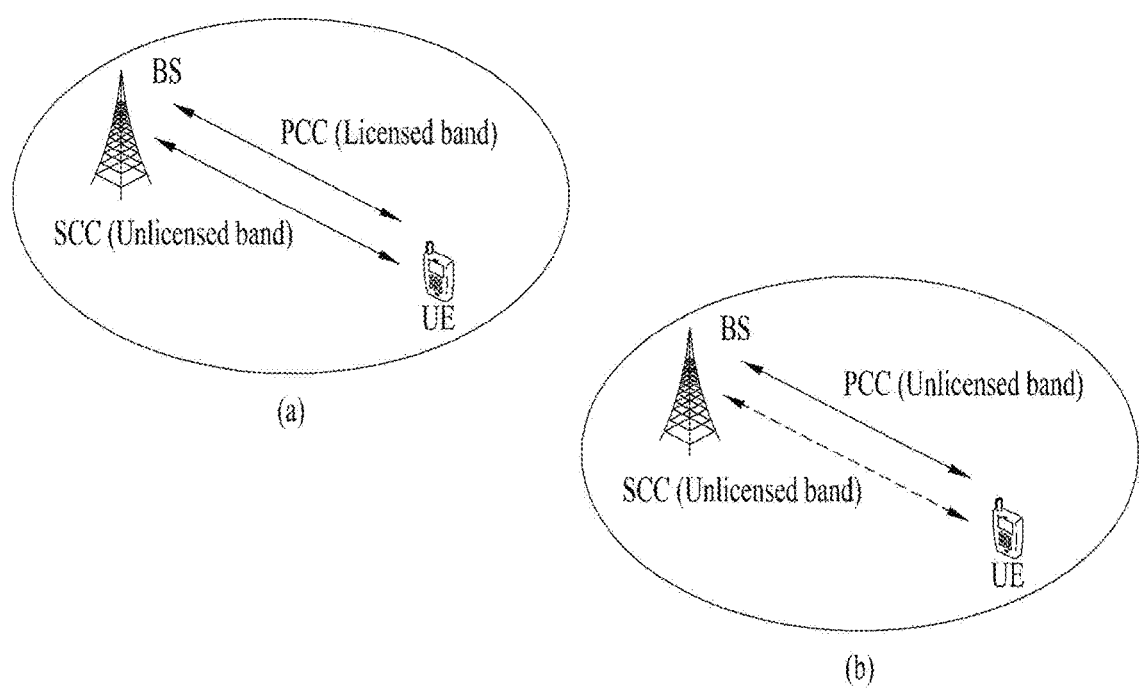
FIGS. 13 and 14 are diagrams for explaining downlink channel transmission in an unlicensed band.

RSSI: RSSI means received wide band power including noise and thermal noise generated within a bandwidth defined by a receiver pulse shaping filter. Even in this case, the reference point for the RSSI should be an antenna connector of a UE. If receiver diversity is in use, a reported RSSI value shall not be lower than the RSSI of anyone of individual diversities FIG. 13 illustrates a wireless communication system supporting an unlicensed band applicable to the present disclosure.

Herein, a cell operating in a licensed band (L-band) is defined as an L-cell, and a carrier in the L-cell is defined as a (DL/UL) LCC. A cell operating in an unlicensed band (U-band) is defined as a U-cell, and a carrier in the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on an LCC and a UCC where carrier aggregation is applied as shown in FIG. 13(a), the LCC and the UCC may be set to a primary CC (PCC) and a secondary CC (SCC), respectively. The BS and the UE may transmit and receive signals on one UCC or on a plurality of UCCs where carrier aggregation is applied as shown in FIG. 13(b). In other words, the BS and UE may transmit and receive signals on UCC(s) with no LCC.

Signal transmission and reception operations in U-bands, which will be described later in the present disclosure, may be applied to all of the aforementioned deployment scenarios (unless specified otherwise).

The NR frame structure shown in FIG. 6 may be used for operation in a U-band. The configuration of OFDM symbols reserved for UL/DL signal transmission in a frame structure for the U-band may be determined by the BS. In this case, the OFDM symbol may be replaced with an SC-FDM(A) symbol.

For DL signal transmission in the U-band, the BS may inform the UE of the configuration of OFDM symbols used in subframe #n through signaling. Herein, a subframe may be replaced with a slot or a time unit (TU).

Specifically, in the LTE system supporting U-bands, the UE may assume (or recognize) the configuration of occupied OFDM symbols in subframe #n based on a specific filed in DCI (e.g., 'Subframe configuration for LAA' field, etc.), which is received in subframe #n−1 or subframe #n from the BS.

Table 4 shows how the 'Subframe configuration for LAA' field indicates the configuration of OFDM symbols used to transmit DL physical channels and/or physical signals in the current and/or next subframe.

TABLE 4

| Value of 'Subframe configuration for LAA' field in current subframe | Configuration of occupied OFDM symbols (current subframe, next subframe) |
| --- | --- |
| 0000 | (—, 14) |
| 0001 | (—, 12) |
| 0010 | (—, 11) |
| 0011 | (—, 10) |
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, —) |
| 1101 | (3, —) |
| 1110 | reserved |
| 1111 | reserved |

NOTE:
(—, Y) means UE may assume the first Y symbols are occupied in next subframe and other symbols in the next subframe are not occupied.
(X, —) means UE may assume the first X symbols are occupied in current subframe and other symbols in the current subframe are not occupied.
(X, *) means UE may assume the first X symbols are occupied in current subframe, and at least the first OFDM symbol of the next subframe is not occupied.

For UL signal transmission in the U-band, the BS may provide information on a UL transmission interval to the UE through signaling.

Specifically, in the LTE system supporting U-bands, the UE may obtain 'UL duration' and 'UL offset' information on subframe #n from the 'UL duration and offset' field in detected DCI.

Table 5 shows how the 'UL duration and offset' field indicates the configurations of a UL offset and a UL duration.

TABLE 5

| Value of 'UL duration and offset' field | UL offset, l(in subframes) | UL duration, d(in subframes) |
| --- | --- | --- |
| 00000 | Not configured | Not configured |
| 00001 | 1 | 1 |
| 00010 | 1 | 2 |
| 00011 | 1 | 3 |
| 00100 | 1 | 4 |
| 00101 | 1 | 5 |
| 00110 | 1 | 6 |
| 00111 | 2 | 1 |
| 01000 | 2 | 2 |
| 01001 | 2 | 3 |
| 01010 | 2 | 4 |
| 01011 | 2 | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |
| 10100 | 4 | 2 |
| 10101 | 4 | 3 |
| 10110 | 4 | 4 |
| 10111 | 4 | 5 |
| 11000 | 4 | 6 |
| 11001 | 6 | 1 |
| 11010 | 6 | 2 |
| 11011 | 6 | 3 |
| 11100 | 6 | 4 |
| 11101 | 6 | 5 |
| 11110 | 6 | 6 |
| 11111 | reserved | reserved |

For example, when the 'UL duration and offset' field configures (or indicates) UL, offset l and UL duration d for subframe #n, the UE may not need to receive DL physical channels and/or physical signals in subframe #n+l+i (where i=0, 1, . . . , d−1).

The BS may perform one of the following unlicensed band access procedures (e.g., channel access procedures (CAPs)), for a DL signal transmission in an unlicensed band.

(1) First DL CAP Method

Figure 14:
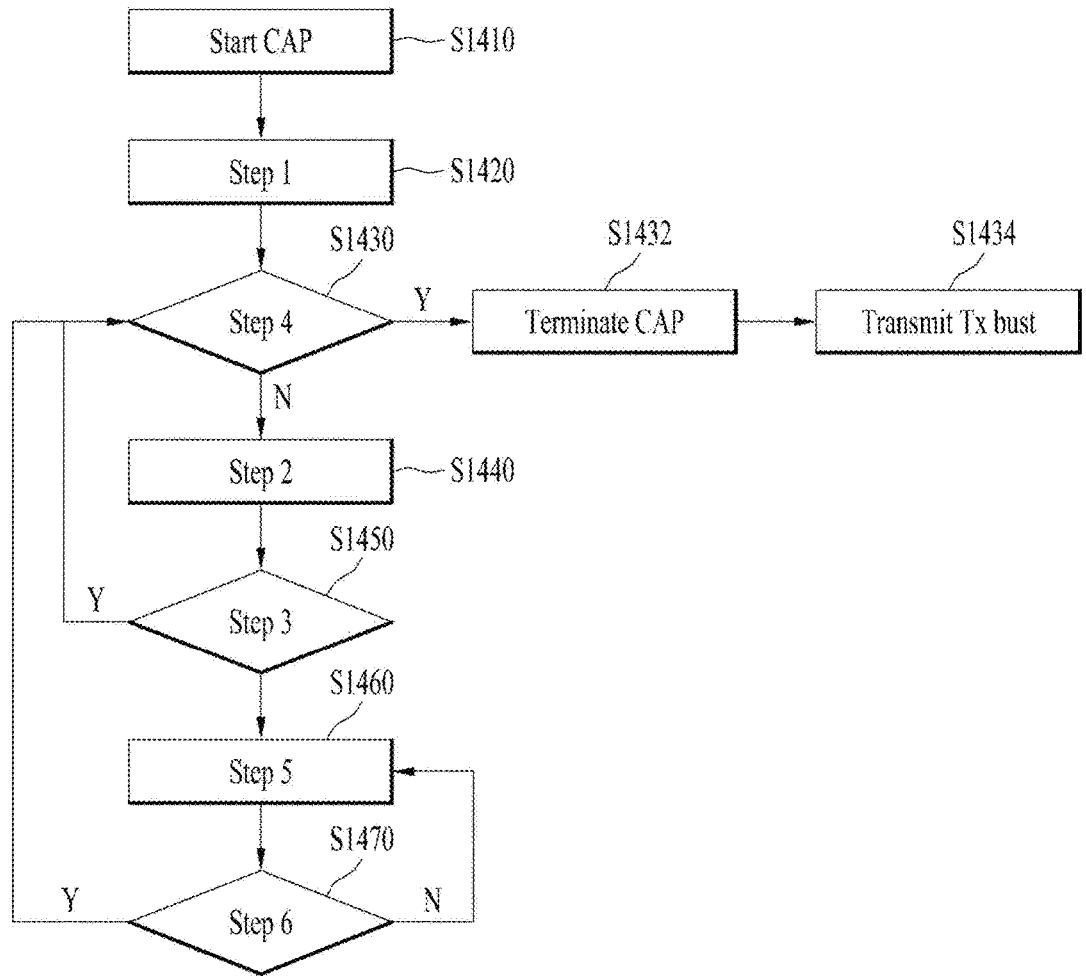

FIG. 14 is a flowchart illustrating a CAP for a DL signal transmission in an unlicensed band at a BS.

For a DL signal transmission (e.g., transmission of a signal including a PDSCH/PDCCH/EPDCCH) in an unlicensed band, a BS may initiate a CAP (S1110). The BS may randomly select a backoff counter N within a contention window (CW) according to step 1. N is set to an initial value, $N_{init}$ (S1120). $N_{init}$ is a random value selected from among the values between 0 and $CW_p$. Subsequently, if the backoff counter N is 0 in step 4 (Y in S1130), the BS terminates the CAP (S1132). Subsequently, the BS may transmit a Tx burst including a PDSCH/PDCCH/EPDCCH (S1134). On the other hand, if the backoff counter N is not 0 (N in S1130), the BS decrements the backoff counter N by 1 according to step 2 (S1140). Subsequently, the BS determines whether a channel of U-cell(s) is in an idle state (S1150). If the channel is in the idle state (Y in S1150), the BS determines whether the backoff counter N is 0 (S1130). On the contrary, if the channel is not idle in step S1150, that is, the channel is busy (N in S1150), the BS determines whether the channel is in the idle state for a defer duration $T_d$ (25 usec or more) longer than a slot time (e.g., 9 usec) according to step 5 (S1160). If the channel is idle for the defer duration (Y in S1170), the BS may resume the CAP. The defer duration may span a period of 16 usec and the following $m_p$ consecutive slot durations (e.g., 9 usec). On the contrary, if the channel is idle for the defer duration (N in S1170), the BSS re-performs step S1160 to check again whether the channel of the U-cell(s) is idle for a new defer duration.

Table 6 illustrates that $m_p$, a minimum CW, a maximum CW, a maximum channel occupancy time (MCOT), and an allowed CW size for a CAP vary according to a channel access priority class.

TABLE 6

| Channel Access Priority Class (p) | $m_p$ | $CW_{min,p}$ | $CW_{max,p}$ | $T_{ulcot,p}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A CW size applied to the first DL CAP may be determined in various ways. For example, the CW size may be adjusted based on the probability of HARQ-ACK values corresponding to PDSCH transmission(s) within a predetermined time period (e.g., a reference TU) being determined to be NACK. In the case where the BS transmits a DL signal including a PDSCH related to a channel access priority class p on a carrier, when the probability of HARQ-ACK values corresponding to PDSCH transmission(s) in a reference subframe k (or a reference slot k) is 80% (z=80%), the BS increments a CW value set for each priority class to the next higher value. Alternatively, the BS maintains the CW value set for each priority class to be an initial value. The reference subframe (or reference slot) may be defined as the starting subframe (or starting slot) of the latest transmission on the carrier, for which at least some HARQ-ACK feedback is available.

(2) Second DL CAP Method

The BS may perform a DL signal transmission (e.g., a signal transmission including a discovery signal, without a PDSCH/PDCCH/EPDCCH) in an unlicensed band according to the second DL CAP method as described below.

If the signal transmission duration of the BS is 1 ms or less, the BS may perform a DL signal transmission (a signal including a discovery signal, without a PDSCH) in an unlicensed band, immediately after a corresponding channel is sensed as idle for at least a sensing interval $T_{drs}$ (=25 us). $T_{drs}$ includes a duration of $T_f$(=16 us) immediately followed by one slot duration $T_{sl}$ (=9 us).

(3) Third DL CAP Method

The BS may perform the following CAPs for a DL signal transmission on multiple carriers of an unlicensed band.

1) Type A: The BS performs a CAP for multiple carriers based on a counter N (considered in the CAP) defined for each carrier, and performs a DL signal transmission based on the CAP.

Type A1: The counter N is determined independently for each carrier, and a DL signal transmission on each carrier is performed based on the counter N for the carrier.

Type A2: An N value for a carrier with the largest CW size is determined as the counter N for each carrier, and a DL signal transmission on each carrier is performed based on the counter N for the carrier.

2) Type B: The BS performs a CAP based on a counter N only for a specific one of a plurality of carriers. Before a signal transmission on the specific carrier, the BS performs a DL signal transmission by determining whether the channel is idle on the other carriers.

Type B1: A single CW size is defined for a plurality of carriers, and the BS uses the single CW size, when performing a CAP based on a counter N for a specific carrier.

Type B2: A CW size is defined for each carrier, and the largest of the CW sizes is used in determining Nina for a specific carrier.

As more and more communication devices require high communication capacity, the efficient use of limited frequency bands becomes an important issue in wireless communication systems. In cellular systems including the LTE/NR system, a method of using U-bands widely used in the conventional Wi-Fi system such as the 2.4 GHz band or U-bands such as the 5/6 GHz band and 60 GHz band for traffic offloading is currently discussed. Basically, it is assumed that each communication node competes with other communication nodes to transmit and receive radio signals in U-bands. Thus, before transmitting a signal, each communication node needs to perform channel sensing to check whether other communication nodes perform signal transmission. In this document, the above operation is referred to as listen before talk (LBT) or channel access procedure (CAP).

In particular, an operation of checking whether other communication nodes perform signal transmission is referred to as carrier sensing (CS). When it is determined that there is no communication node performing signal transmission, it may be said that clear channel assessment (CCA) is confirmed. In the LTE/NR system, the BS or UE needs to perform LBT to transmit a signal in a U-band. In addition, when the BS or UE in the LTE/NR system performs signal transmission, other communication nodes such as a Wi-Fi node, etc. need to perform the LBT to avoid causing interference to the BS or UE. For example, in Wi-Fi specifications (801.11ac), a CCA threshold of −62 dBm is defined for a non-Wi-Fi signal, and a CCA threshold of −82 dBm is defined for a Wi-Fi signal. That is, when a station (STA) or an access point (AP) receives a non-Wi-Fi signal with power over −62 dBm, the STA or AP may not perform signal transmission to avoid causing interference.

The NR system supports transmission of one or more SS/PBCH blocks, and each SS/PBCH block has a specific index. The index of an SS/PBCH block may be obtained from sequence information in the corresponding SS/PBCH block and/or PBCH payload including a scrambling sequence. Accordingly, when the UE obtains the index of the corresponding SS/PBCH block from the information in the SS/PBCH block during initial access, the UE may recognize the time-domain boundaries of frames/subframes/slots and SS/PBCH block indices from a predetermined relationship between "SS/PBCH block indices" and "time-domain boundaries of frames/subframes/slots". In addition, the UE may also recognize the indices of the frames/subframes/slots by combining other information in the SS/PBCH block. Further, the UE may perform RRM/RLM measurement for a serving cell and/or a neighbor cell for the purpose of mobility support, and in this case, the UE may require information about SS/PBCH blocks of the neighboring cell to perform measurement for each SS/PBCH block of the neighboring cell.

However, for random access in U-bands, since transmission is allowed only when the CAP is successful before the transmission, an SS/PBCH block that the BS desires to transmit at a specific time may not be transmitted. When the transmission of the SS/PBCH block is dropped, the time required for UEs attempting the initial access to camp on a cell may increase. In addition, the time required for UEs attempting serving/neighbor cell measurement to achieve meaningful measurement results may also increase.

Thus, a method of increasing the transmission opportunity of an SS/PBCH block where CAP failure is expected may be considered. From the perspective of the UE receiving the SS/PBCH block, a method of resolving ambiguity that may occur if the UE does not know when the BS succeeds in the CAP and transmits the SS/PBCH block may be considered. To this end, two methods may be considered as follows.

Method 1) Method of providing corresponding information through PBCH payload

Method 2) Method of providing delay information through specific sequence

Here, Method 1) and Method 2) may have the following advantages and disadvantages.

According to Method 1), although transmitted information has high reliability, but the receiver should perform PBCH decoding to obtain the information. In addition, when multi-cell interference is present, PBCH decoding performance is degraded, and thus, the time required to obtain the information may increase.

In Method 2), since 'transmission time information' is obtained by sequence detection, decoding performance may be superior compared to the PBCH decoding performance. Specifically, comparing the amount of information that may be transmitted by the PBCH payload and the sequence, the PBCH payload may include not only 'transmission delay time information' but also as various information related to the system, but the sequence may carry limited information including the 'transmission delay time information'. In a multi-cell interference environment, the PBCH decoding performance may be degraded due to degradation of channel estimation performance, but the sequence may have a small decrease in the decoding performance, which is caused by the channel estimation performance degradation, so that the detection performance may be higher than that of the PBCH decoding.

In Method 2), the implementation of the UE may be relatively simple. When a delayed position due to LBT is represented by the sequence, the sequence is required as much as the delayed position. If 'delay time information', which is represented by M pieces, is additionally included in sequences used to transmit other information, the number of required sequences may be M times larger than N previously used sequences. That is, a total of N*M sequences may be used.

In other words, the number of required sequences may be a multiple of the number of pieces of information to be added, and thus, the UE should perform signal detection as many times as the multiple of the number of pieces of information to be added. For example, in the case of a PBCH DMRS sequence, 8 different sequences are used for each specific cell ID. If M pieces of time delay information due to LBT is transmitted based on the PBCH DMRS sequence, a total of 8*M PBCH DMRS sequences need to be used, which may burden the detection performance of the UE.

Considering that SS/PBCH block detection is performed in various cases such as initial cell detection, neighboring cell signal quality measurement, handover, and SCell/PS-Cell addition, a method that does not increase the burden of detection added in order for the UE to obtain information about when the BS starts SS/PBCH block transmission after succeeding in the CAP is required.

Accordingly, the present disclosure proposes a method of providing information about when the BS transmits the SS/PBCH block after succeeding in the CAP and a method by which the UE obtains information about a timing at which the SS/PBCH block is transmitted after receiving the corresponding SS/PBCH block.

The BS may transmit information about a point at which the SS/PBCH block is transmitted after succeeding in the CAP. In other words, if a candidate position in which a specific SS/PBCH block is capable of being transmitted is determined, the BS may include information on the corresponding candidate position in the SS/PBCH block and transmit the information to provide the candidate position to the UE. For example, when X SS/PBCH block indices are cyclically mapped to candidate positions, information on a position to which an SS/PBCH block index is mapped may be transmitted together with the corresponding SS/PBCH block index.

Before describing the details of the present disclosure, operations of a UE, a BS, and a network according to embodiments of the present disclosure will be described with reference to FIGS. 15 to 17.

Figure 15:
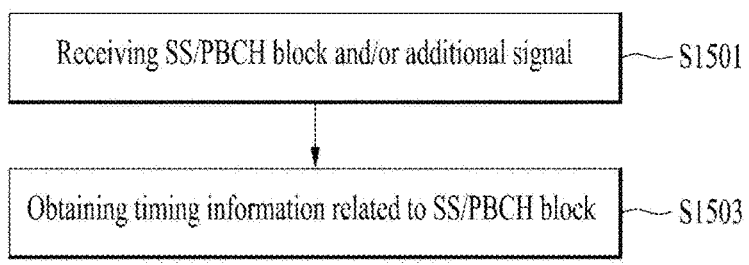
FIGS. 15, 16 and 17 are diagrams illustrating operations of a user equipment (UE), a base station (BS), and a network according to the present disclosure.

FIG. 15 is a diagram for explaining the operations of the UE according to the present disclosure. Referring to FIG. 15, the UE may receive an SS/PBCH block and/or an additional signal for acquiring time information about the SS/PBCH block (S1501). The UE may acquire the time information about the received SS/PBCH block based on the SS/PBCH block and/or the additional signal (S1503). In this case, methods by which the UE receives the SS/PBCH block and acquire the time information based on the SS/PBCH block in steps S1501 to S1503 will be described later in Embodiments 1 to 3.

The UE of FIG. 15 may be any one of various wireless devices shown in FIGS. 25 to 28. For example, the UE of FIG. 15 may be a first wireless device 100 of FIG. 25 or a wireless device 100 or 200 of FIG. 26. In other words, the operations of FIG. 15 may be performed and executed by any one of the various wireless devices illustrated in FIGS. 25 to 28.

Figure 16:
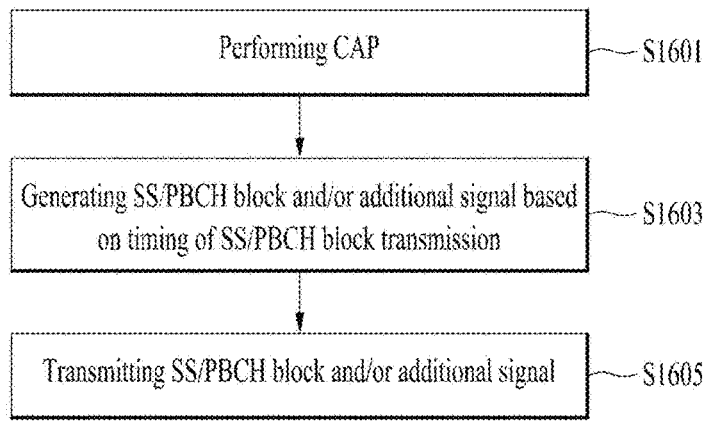

FIG. 16 is a diagram for explaining the operations of the BS according to the present disclosure. Referring to FIG. 16, the BS performs a CAP to transmit an SS/PBCH block in a U-band (S1601). The BS may generate the SS/PBCH block and/or an additional signal for acquiring time information about the SS/PBCH block based on a time when the BS succeeds in the CAP, i.e., based on the transmission timing of the SS/PBCH block (S1603).

The BS may transmit the generated SS/PBCH block and/or additional signal (S1605). In this case, methods by which the BS generates and transmits the SS/PBCH block in steps S1601 to S1605 will be described later in Embodiments 1 to 3.

The BS of FIG. 16 may be any one of the various wireless devices shown in FIGS. 25 to 28. For example, the BS of FIG. 16 may be a second wireless device 200 of FIG. 25 or the wireless device 100 or 200 of FIG. 26. In other words, the operations of FIG. 16 may be performed and executed by any one of the various wireless devices illustrated in FIGS. 25 to 28.

Figure 17:
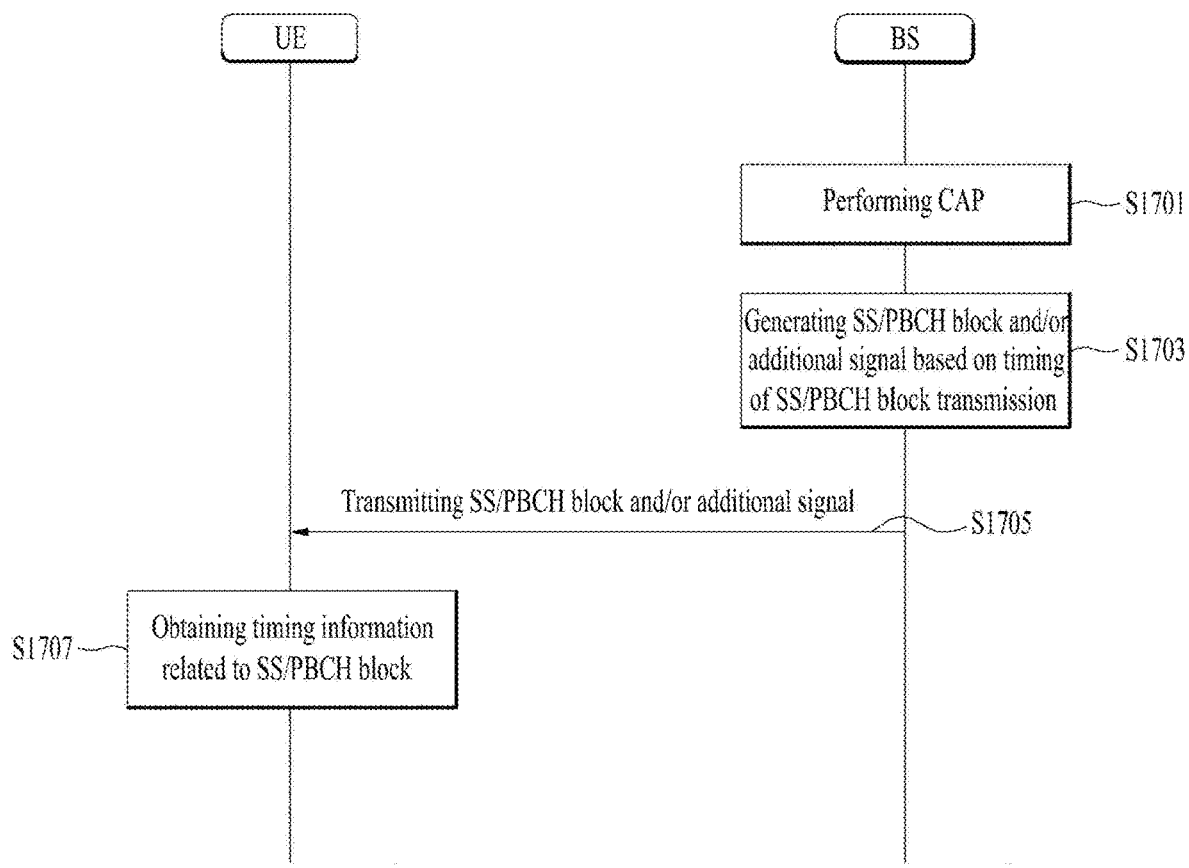

FIG. 17 is a diagram for explaining the operations of the network according to the present disclosure. Referring to FIG. 17, the BS performs a CAP to transmit an SS/PBCH block in a U-band (S1701). The BS may generate the SS/PBCH block and/or an additional signal for acquiring time information about the SS/PBCH block based on a time when the BS succeeds in the CAP, i.e., based on the transmission timing of the SS/PBCH block (S1703).

The BS may transmit the generated SS/PBCH block and/or additional signal (S1705). The UE may acquire time information about the received SS/PBCH block based on the SS/PBCH block and/or additional signal (S1707). In this case, methods by which the BS generates and transmits the SS/PBCH block and the UE acquire the time information about the SS/PBCH block based on the SS/PBCH block in steps S1701 to S1707 will be described later in Embodiments 1 to 3.

Embodiment 1: Method of Obtaining SS/PBCH Block Transmission Time Information Based on Subset of PBCH DMRS Sequence In the NR system, two SS/PBCH blocks are transmitted for each slot. For 15 kHz SCS, a total of 8 SS/PBCH blocks may be transmitted in slots #0, #1, #2, and #3, and the 8 SS/PBCH blocks may have indices of #0 to #7. Since these SS/PBCH blocks are arranged within a duration of 5 ms, 8 SS/PBCH blocks may be transmitted again in four slots, starting from the first slot of a next 5-ms duration after the 5-ms duration to which the SS/PBCH blocks of #0 to #7 are allocated. In other words, no SS/PBCH blocks are transmitted in slot #4.

For 30 kHz SCS, a total of 8 SS/PBCH blocks may be transmitted in slots #0, #1, #2, and #3, and the 8 SS/PBCH blocks may have indices of #0 to #7. Since the duration of slots #0 to #3 is 2 ms, no SS/PBCH blocks are transmitted in slots #4 to #9, and 8 SS/PBCH blocks may be transmitted again from slot #10, which is the starting slot of a next 5-ms duration.

If the total number of SS/PBCH blocks capable of being transmitted in NR-U is 4, SS/PBCH blocks with indices #0 to #3 may be repeatedly mapped twice to locations where SS/PBCH blocks with indices #0 to #7 are mapped. On the other hand, the indices of 8 SS/PBCH blocks may be obtained from PBCH DMRS sequences. That is, PBCH DMRS sequence indices #0 to #7 obtained from the PBCH DMRS sequences may be mapped one-to-one to SS/PBCH blocks having the same indices. As described above, if four SS/PBCH blocks are repeatedly mapped twice in NR-U, PBCH DMRS sequences with indices #4 to #7 may be mapped once more to SS/PBCH blocks with indices #0 to #3. For example, PBCH DMRS sequences with indices #0 and #4 may be mapped to an SS/PBCH block with index #0. That is, an SS/PBCH block corresponding to PBCH DMRS sequence #0 and an SS/PBCH block corresponding to PBCH DMRS sequence #4 may have the same index although the two blocks are received at different times. When SS/PBCH blocks have the same index, it may be interpreted to mean that the SS/PBCH blocks are transmitted on the same beam. That is, SS/PBCH blocks having the same index may be viewed as having a QCL relationship.

Therefore, the UE may acquire an SS/PBCH block index from a remainder obtained by dividing the SS/PBCH block index by a PBCH DMRS sequence index and identify a location at which the corresponding SS/PBCH block is transmitted from the PBCH DMRS sequence.

Figure 18:
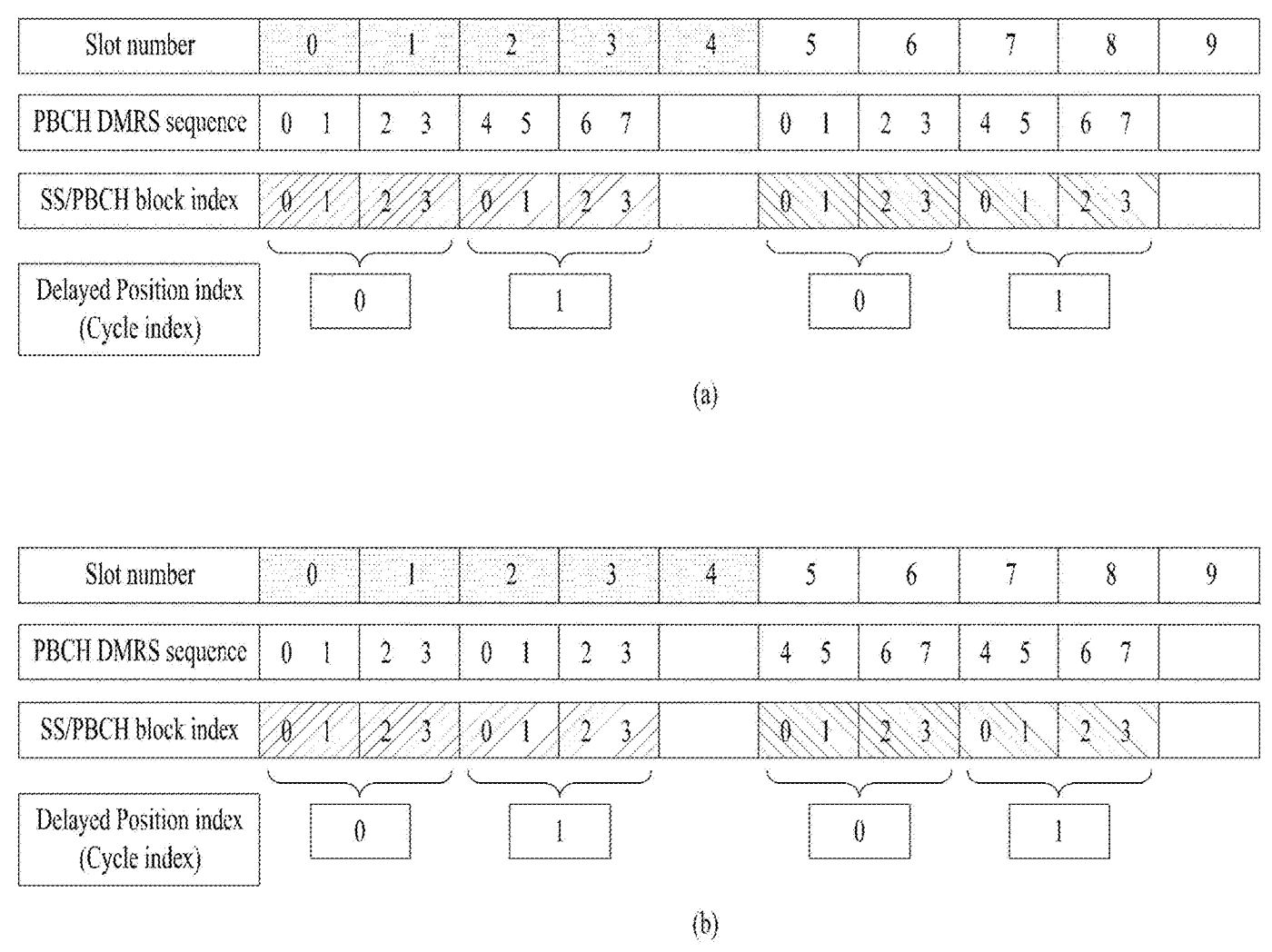

For example, referring to FIG. 18(a), when the BS fails in the CAP in slot number #0 but succeeds in the CAP in slot number #1, the BS may transmit SS/PBCH blocks in the beam order corresponding to SS/PBCH block indices #2, #3, #0, and #1. In this case, PBCH DMRS sequences may have indices #2, #3, #4, and #5. The UE performs correlation based on a total of 8 PBCH DMRS sequences in the same way as in licensed bands. If the correlation of a PBCH DMRS having a specific PBCH DMRS sequence index is measured above a predetermined value, the UE may obtain the transmission time of a SS/PBCH block based on an SS/PBCH block index related to the corresponding PBCH DMRS sequence index. If the UE detects PBCH DMRS sequence index #4, the UE may recognize that SS/PBCH block index #0 is received in slot number #2.

Referring to FIG. 18(b), a set of PBCH DMRS sequences used within a specific duration may be designated. For example, PBCH DMRS sequence indices #0 to #3 may be used in the first 5-ms duration of a duration of 10 ms, and PBCH DMRS sequence indices #4 to #7 may be used in the latter 5-ms duration. In other words, PBCH DMRS sequences may be used repeatedly in each 5-ms duration. If the BS succeeds in the CAP in the first 5-ms duration, the BS may transmit a PBCH DMRS based on a PBCH DMRS sequence set (e.g., PBCH DMRS sequence indices #0 to #4) used within the first 5-ms duration. The UE may attempt to detect a signal based on 8 PBCH DMRS sequences and obtain SS/PBCH block indices and information about the 5-ms duration based on the indices of detected PBCH DMRS sequences. Further, a method of indicating a value for shifting SS/PBCH block indices cyclically within a specific duration may be applied together.

Embodiment 2: Method of Obtaining SS/PBCH Block Transmission Time Information Based on Phases of SSS and PBCH RE If the BS designates a plurality of candidate times for transmitting SS/PBCH blocks, the BS may change and transmit information about several signals included in the SS/PBCH blocks over time.

For example, the phase of a PBCH RE (i.e., both a DMRS RE and a data RE or only a PBCH DMRS RE) may be inverted and transmitted. In this case, the PBCH RE may mean both a DMRS RE and a PBCH data RE or only a PBCH DMRS RE.

Figure 19:
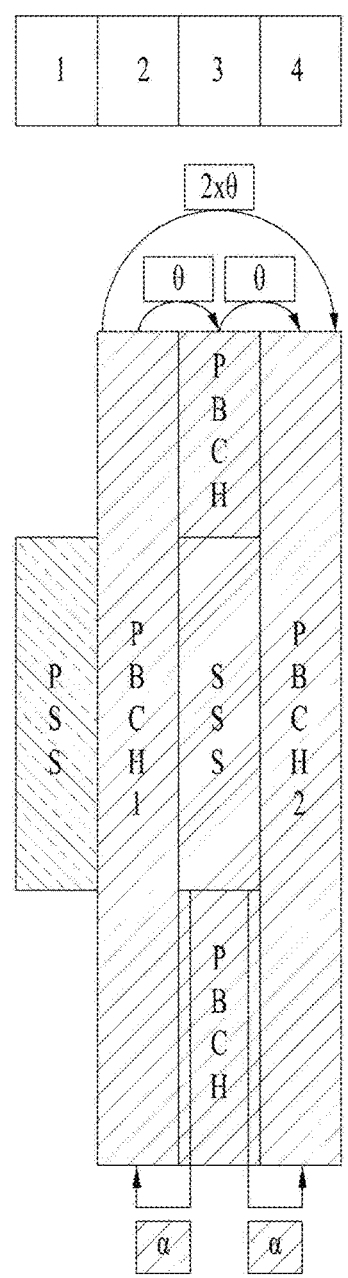

For example, referring to FIG. 19, in cyclic index 0, transmission may be performed with the current phase (+), and in cyclic index 1, transmission may be performed by multiplying the inverted phase (−). Upon receiving an SSS and a PBCH DMRS transmitted by the BS, the UE may estimate a radio channel from each signal and measure the strength of the SSS and DMRS based on the estimated channel. In this case, by comparing the phase of radio channel information estimated from the SSS and the phase of radio channel information estimated from the PBCH DMRS, the UE may obtain time information about the corresponding SS/PBCH block.

For example, referring to FIG. 18(a), a PBCH may be transmitted with the current phase (+) in the first 5-ms duration, and a PBCH may be transmitted with the inverted phase (−) in the latter 5-ms duration. The UE may obtain information about the first or latter 5-ms duration by comparing the phases of estimated radio channels.

In one embodiment, referring to FIG. 19, the phases of a PBCH DMRS RE and a PBCH data RE mapped to the second and fourth OFDM symbols may be changed, and the phases of a PBCH DMRS RE, a PBCH data RE, and an SSS mapped to the third OFDM symbol may not be changed.

In another embodiment, referring to FIG. 19, the phases of a PBCH DMRS RE and a PBCH data RE mapped to the second, third, and fourth OFDM symbols may be changed, and the phase of an SSS mapped to the third OFDM symbol may not be changed.

The phase change in the PBCH RE and/or SSS may be used to inform a group of DMRS sequences. For example, a PBCH DMRS sequence group used to identify the transmission positions of SS/PBCH blocks within a total duration of 5 ms in which the SS/PBCH blocks are capable of being transmitted may be recognized based the above-described phase change. For example, referring to FIG. 20(a), a PBCH DMRS sequence group capable of being transmitted in slot numbers #0 to #3 and a PBCH DMRS sequence group capable of being transmitted in slot numbers #4 to #7 may be identified by the phases of SS/PBCH blocks. For example, if the phase of an SS/PBCH block is +1, the UE may recognize that the corresponding SS/PBCH block is transmitted in slot numbers #0 to #3. If the phase of an SS/PBCH block is −1, the UE may recognize that the corresponding SS/PBCH block is transmitted in slot numbers #4 to #7.

If the phase change shown in FIG. 19 is subdivided according to modulation schemes such as QPSK, 8PSK, 16PSK, etc., more information may be provided.

Figure 20:
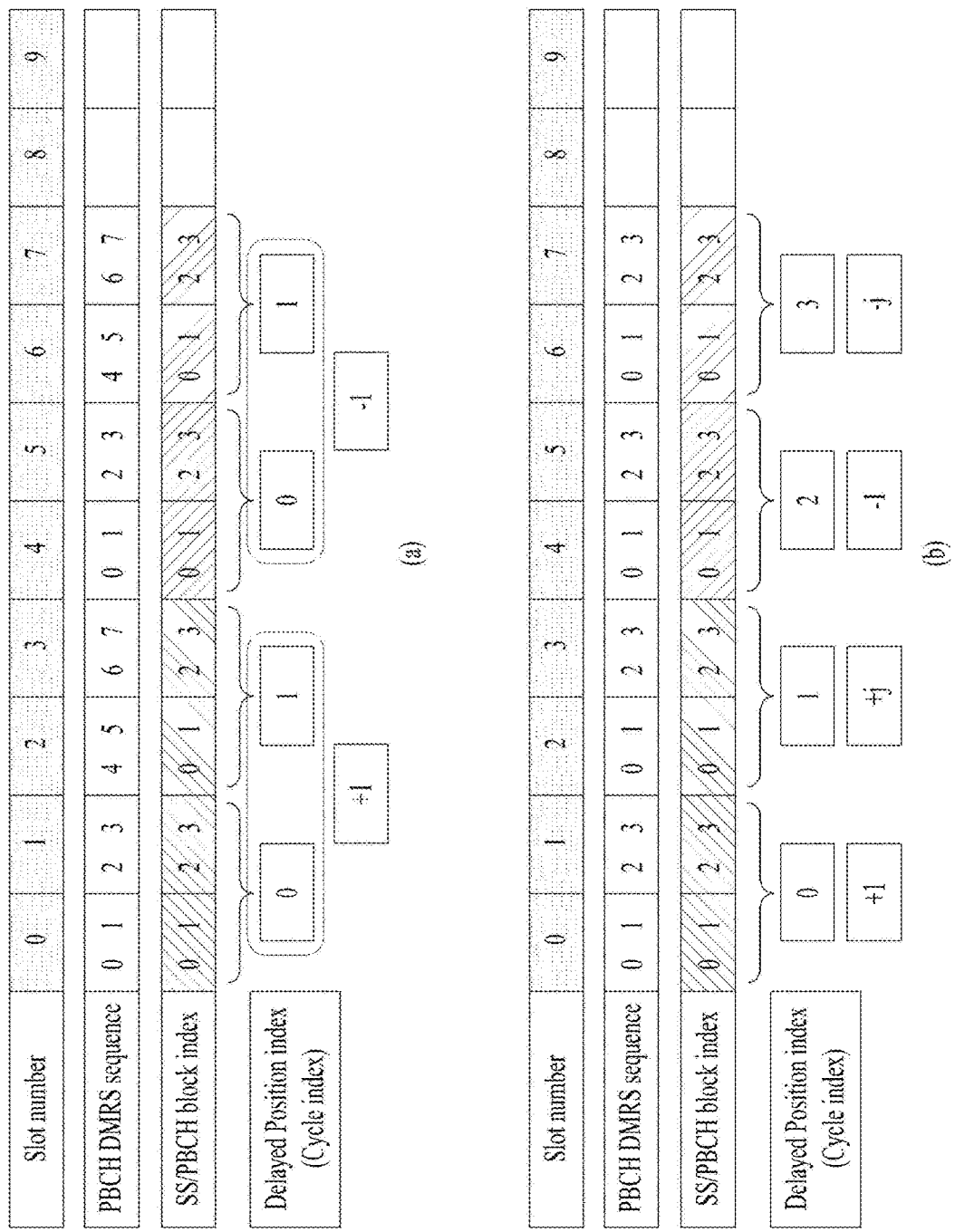
Figure 21:
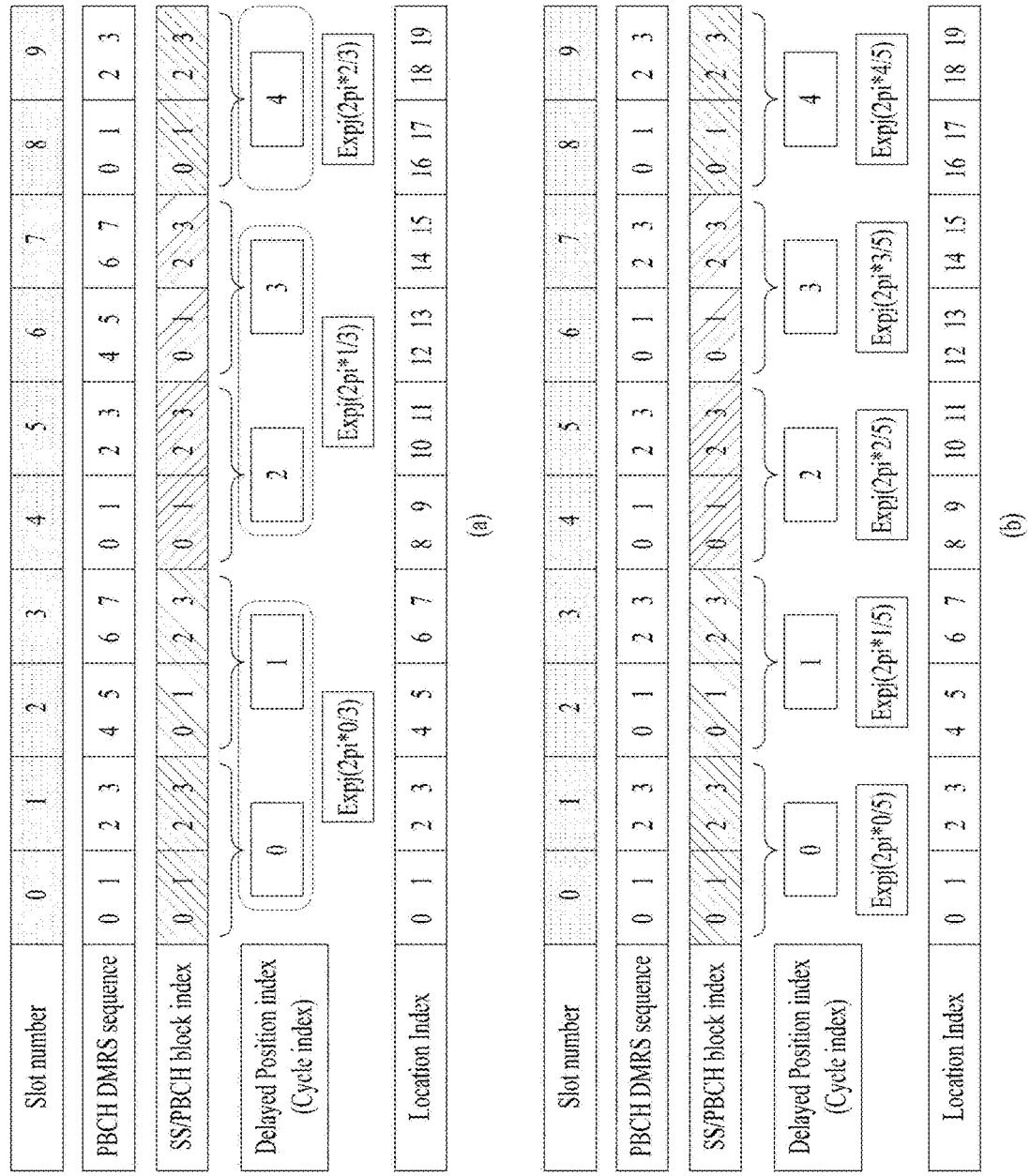

For example, referring to FIGS. 20 and 21, when there are a total of four positions for cyclic mapping as shown in FIGS. 20(a) and 20(b), transmission may be performed by changing the phases in cyclic indices #0 to #3 by +1, +j, −1, and −j, respectively. For example, referring to FIG. 20(a), when the number of PBCH DMRS sequences is greater than the number of SS/PBCH block indices, a delayed position index may be provided by the PBCH DMRS sequence and phase change information. For example, referring to FIG. 20(a), if SS/PBCH block index #0 is transmitted in slot number #2, the BS may generate PBCH DMRS sequence index #4 and, at the same time, change the phase of a PBCH RE by +1. The UE may detect that the index of the PBCH DMRS sequence transmitted by the BS is #4 based on 8 candidate PBDH DMRS sequences. In addition, by comparing the phase change of the PBCH RE, the UE may recognize that the index of the transmitted SS/PBCH block is #0 and the SS/PBCH block is transmitted in slot number #2.

Referring to FIGS. 20(b) and 21(b), when there are a total of N positions for cyclic mapping, SS/PBCH blocks may be transmitted by changing the phases in cyclic indices #0 to #N−1 by expj(2pi*n/N) (where n=0, . . . , N−1), respectively. For example, FIG. 20(b) shows a case where N=4, and FIG. 21(b) shows a case where N=5.

For example, referring to FIGS. 20(a) and 21(a), when the number of PBCH DMRS sequences is greater than the number of SS/PBCH block indices, a delayed position index may be provided by the PBCH DMRS sequence and phase change information. For example, referring to FIGS. 20(a) and 21(a), if SS/PBCH block index #0 is transmitted in slot number #2, the BS may generate PBCH DMRS sequence index #4 and, at the same time, change the phase of a PBCH RE by +1. The UE may detect that the index of the PBCH DMRS sequence transmitted by the BS is #4 based on 8 candidate PBDH DMRS sequences. In addition, by comparing the phase change of the PBCH RE, the UE may recognize that the index of the transmitted SS/PBCH block is #0 and the SS/PBCH block is transmitted in slot number #2. As shown in FIG. 21(a), if the PBCH DMRS sequence is repeated M times, the phase of the PBCH RE may be changed by expj(2pi*m/M) (m=0, . . . , M−1). Specifically, if the PBCH DMRS sequence is repeated twice as shown in FIG. 20(a), M=2. If the PBCH DMRS sequence is repeated three times as shown in FIG. 21(a), M=3.

On the other hand, as shown in FIGS. 20 to 21, when 8 PBCH DMRS sequences are repeated twice, two slots among a total of 10 slots or four candidate positions among a total of 20 candidate positions may remain. In this case, the remaining slots or positions may be left empty as shown in FIG. 20, or the PBCH DMRS sequence may be repeated as many times as the remaining slots or positions as shown in FIG. 21.

Embodiment 3: Method of Using Additional Sequence

In the NR system, a different sequence may be used for each OFDM symbol in a duration of 10 ms. According to Embodiment 3, when an SS/PBCH block is transmitted in a specific slot, a sequence mapped to an OFDM symbol in the corresponding slot in which the SS/PBCH block is transmitted due to the success of the CAP may be transmitted. In other words, the UE may obtain the index of the SS/PBCH block from a PBCH DMRS and obtain the slot index and/or the OFDM symbol index from another additional sequence.

Alternatively, an additional sequence defined for each cyclic index may be used, and when the SS/PBCH block is transmitted, the defined additional sequence may be transmitted together. In other words, if the BS succeeds in the CAP, the BS may transmit the additional sequence for the cyclic index corresponding to a time when the SS/PBCH block is transmitted. The UE may detect the SS/PBCH block index and the cyclic index so that the UE may obtain the SS/PBCH block index and the transmission time of the SS/PBCH block. The additional sequence may be QCLed with a related SS/PBCH block and transmitted together with the related SS/PBCH block in a half frame. The above-described additional sequence may be transmitted in all or some of the OFDM symbols in which SS/PBCH blocks are transmitted. The UE may detect the additional sequence based on information about a time/frequency/spatial resource in which a specific SS/PBCH block is received.

In a U-band, SS/PBCH blocks may be transmitted at predetermined candidate times, and the transmittable candidate time of each SS/PBCH block may be determined for each index. A candidate time at which an SS/PBCH block may be transmitted regardless of the SS/PBCH block index may be referred to as a location index. The index of an SS/PBCH block transmitted in a specific location index may be obtained from detection of a PBCH DMRS sequence and/or additional sequence, phase comparison between SS/PBCH blocks, and/or PBCH content. In this document, the location index may be replaced with the SS/PBCH block index, and the SS/PBCH block index may be replaced with the beam index or QCL information. In this case, if the index of the SS/PBCH block corresponds to QCL information, it may be assumed that SS/PBCH blocks having the same SS/PBCH block index are transmitted on beams having the same index.

Figure 22:
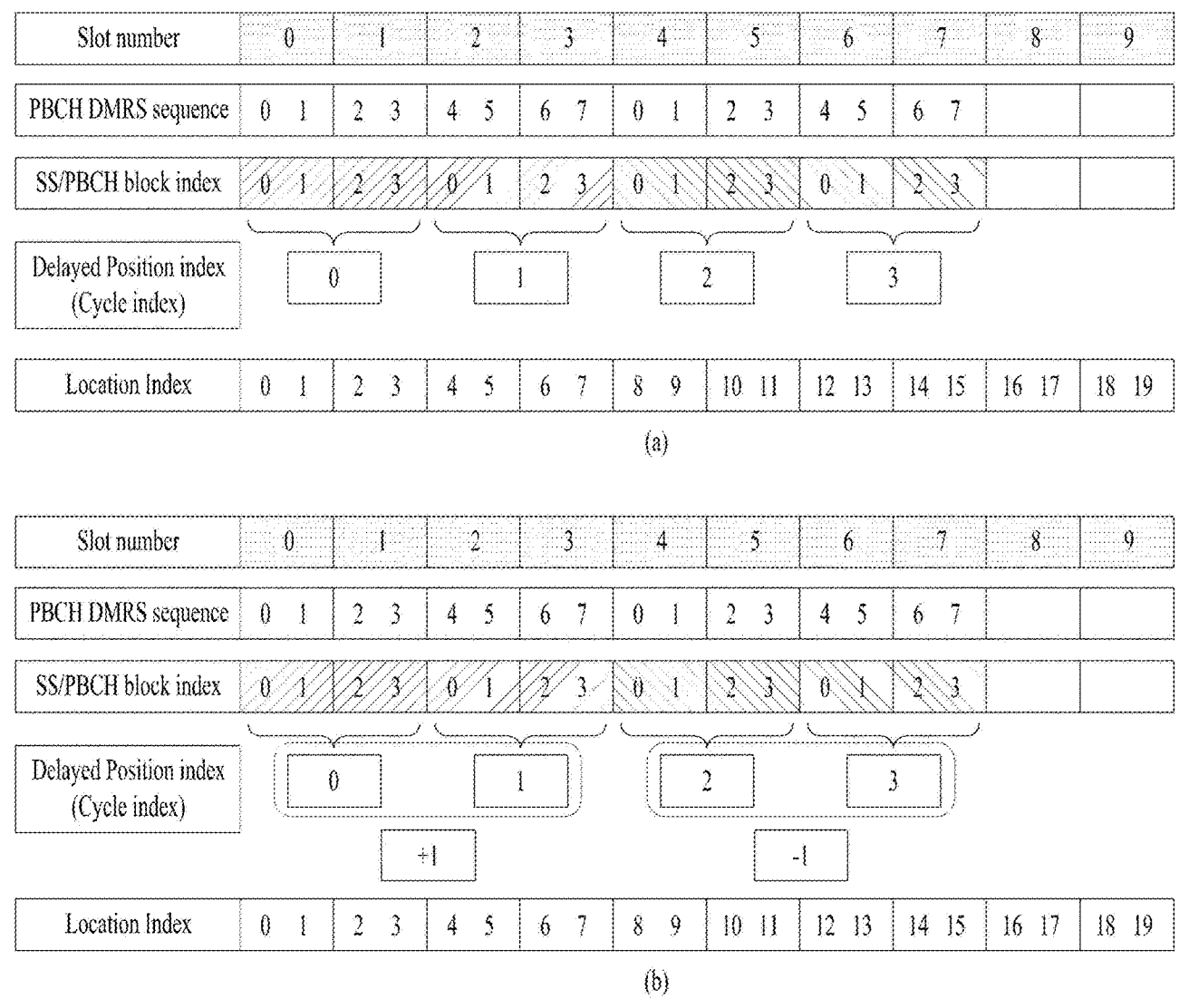
Figure 23:
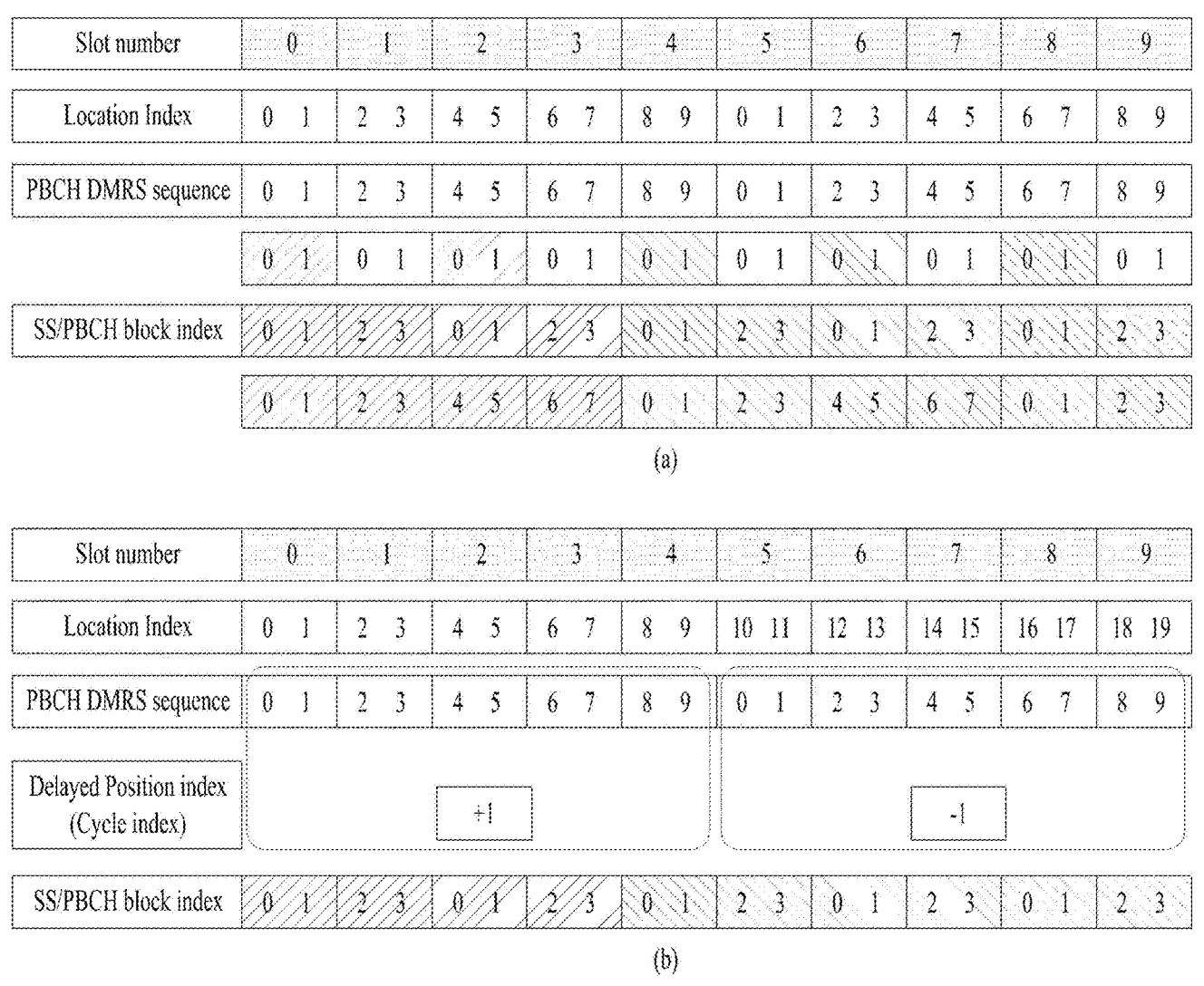

FIGS. 22 and 23 are diagrams for explaining a relationship between the location index and the SS/PBCH block index.

Referring to FIGS. 22 and 23, when an SS/PBCH block is transmitted in a duration of 5 ms, a maximum of 10 candidate locations for transmitting the SS/PBCH block may be configured in 5 slots for 15 kHz SCS, and a maximum of 20 candidate locations may be configured in 10 slots for 30 kHz SCS. In other words, the candidate locations for transmitting the SS/PBCH block may have indices #0 to #9 for the 15 kHz SCS and may have indices #0 to #19 for the 30 kHz SCS.

In the case of a conventional SS/PBCH block, a PBCH DMRS may include up to 8 sequences. To indicate the indices of the candidate locations as described above, the number of PBCH DMRS sequences may increase. Thus, the candidate locations of SS/PBCH blocks may be mapped to PBCH DMRS sequences.

For example, assuming that there are a total of 10 PBCH DMRS sequences, for the 15 kHz SCS, the PBCH DMRS sequences may be mapped to candidate locations with indices #0 to #9. The SS/PBCH block candidate locations with indices #0 to #9 may be configured in slot numbers #0 to #4 and/or slot numbers #5 to #9. Each of PBCH DMRS sequences #0 to #9 may be mapped to each candidate location. When the BS transmits the SS/PBCH block in a slot location where the LBT or CAP is successful, the BS may transmit a PBCH DMRS sequence for a candidate location in which the corresponding SS/PBCH block is actually transmitted.

Alternatively, when the SS/PBCH block is transmitted in the slot position where the CAP or LBT is successful, an SS/PBCH block index corresponding to a candidate location determined according to the value of Q may be used as the SS/PBCH block index that the BS intends to indicate to the UE. For example, the SS/PBCH block index may be used as the initial seed value of a PBCH scrambling sequence. On the other hand, the above-described Q value may mean an interval between SS/PBCHs where QCL may be assumed. For example, the Q value is an interval in which SS/PBCH blocks with the same transmission beam (Tx beam) may be remapped, and this interval may be represented by N durations with respect to the candidate location index. For example, if Q=1, it may be assumed that candidate location indices 0, 1, 2, 3, 4, . . . are QCLed. If Q=2, it may be assumed that candidate location indices 0, 2, 4, 6, 8, . . . are QCLed. If Q=4, it may be assumed that candidate location indices 0, 4, 8, . . . are QCLed. If Q=8, it may be assumed that candidate location indices 0, 8, . . . are QCLed.

For the 30 kHz SCS, PBCH DMRS sequences may be mapped to candidate locations with indices #0 to #19. However, when the number of PBCH DMRS sequences is less than the number of candidate locations, PBCH DMRS sequence indices #0 to #9 may be mapped to candidate location indices #0 to #9 and candidate location indices #10 to #19. To distinguish mapping to first 10 candidate locations #0 to #9 and mapping to next 10 candidate locations #10 to #19, the phases of PBCH symbols may be changed.

Meanwhile, the maximum number of transmittable SSBs may be determined for each frequency band. For U-band transmission, a plurality of candidate locations where the SS/PBCH block may be transmitted due to the LBT or CAP may be designated, and a distance capable of assuming the same QCL condition among the designated candidate locations may be defined.

In the current NR system, the length of a bitmap of actually transmitted SS/PBCH block (ATSS) indices indicated by SIB1 and UE-specific RRC signaling is determined according to the maximum number of SS/PBCH blocks, and the length of a bitmap for designating SS/PBCH blocks to be measured by a measurement object is also determined.

However, considering the positions of SS/PBCH blocks where the same QCL may be assumed as described above, if there are a maximum of 8 SS/PBCH blocks, an 8-bit bitmap may be required, but if the Q value is less than 8, the size of the bitmap for ATSS indication may be reduced than 8 bits. For example, when Q is 4, a 4-bit bitmap may be used.

Alternatively, the UE may maintain the bitmap size configured according to the maximum number of SS/PBCH blocks as it is. The UE may recognize that some bits of the bitmap are valid based on the number of bits in a QCL duration determined according to the Q value and not interpret the remaining values.

For example, if Q is 4, the BS transmits an 8-bit bitmap to the UE for the ATSS indication. However, since only the first four bits among 8 bits are valid, the UE may use the first four bits to obtain ATSS information. In this case, the last four bits may be filled with '0'. That is, the BS may indicate the ATSS through the above-described bitmap, and the UE may perform PDSCH rate matching, SS/PBCH block to RACH Occasion (RO) mapping, and so on based on the ATSS. The BS may designate measurement target SS/PBCH blocks through the reconfigured bitmap, and the UE may measure the corresponding SS/PBCH blocks based on the value of the corresponding bitmap.

In the case of LTE-NR DC, NR-NR DC, or SPCell and/or SCell addition, the value of Q may be indicated by UE-specific RRC signaling (e.g., ServingCellConfigCommon), and in this case, ATSS Information may also be provided. Bits for the ATSS information may be determined according to the value of Q as described above. When the bit size is maintained equal to the existing value, the UE may interpret only a valid area.

It is obvious that each of the examples of the proposed methods may also be included as one implementation method, and thus each example may be regarded as a kind of proposed method. Although the above-described embodiments may be implemented independently, some of the embodiments may be combined and implemented. In addition, it may be regulated that information on whether the embodiments are applied (or information on rules related to the embodiments) are transmitted from the BS to the UE through a predefined signal (e.g., a physical layer signal, a higher layer signal, etc.).

The various details, functions, procedures, proposals, methods, and/or operational flowcharts described above in this document may be applied to a variety of fields that require wireless communication/connection (e.g., 5G) between devices.

Hereinafter, a description will be given in detail with reference to drawings. In the following drawings/descriptions, the same reference numerals may denote the same or corresponding hardware blocks, software blocks, or functional blocks unless specified otherwise.

Figure 24:
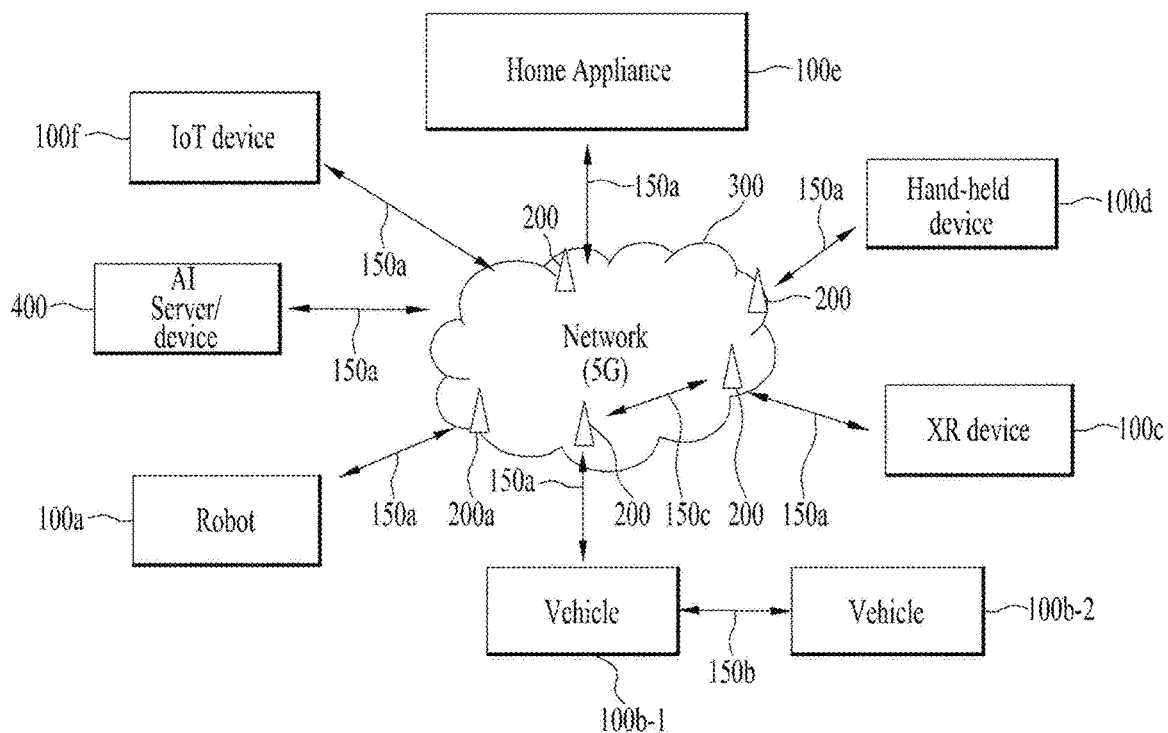
FIG. 24 illustrates an example of a communication system to which embodiments of the present disclosure are applied.

FIG. 24 illustrates a communication system 1 applied to the present disclosure.

Referring to FIG. 24, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a B S/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 25:
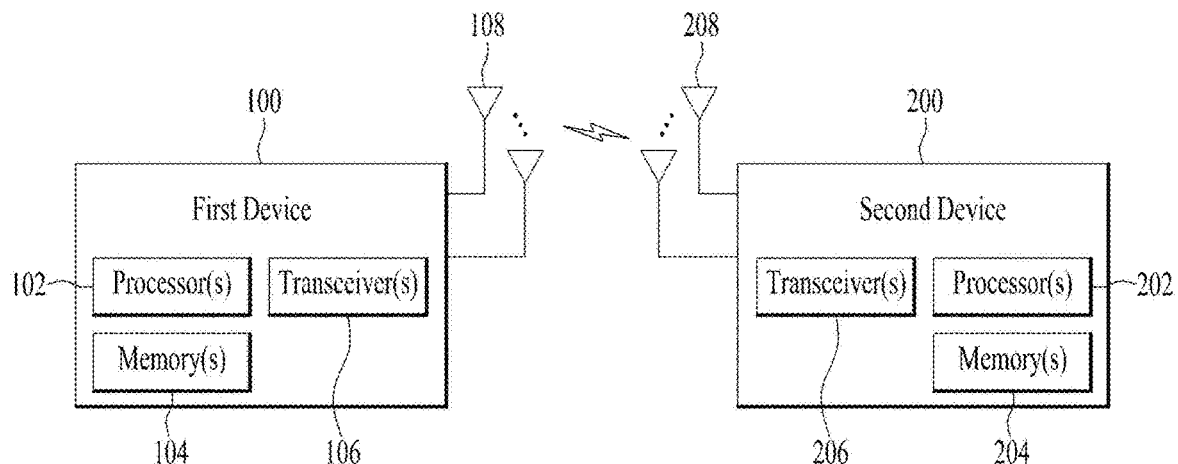
FIGS. 25 to 28 illustrate examples of various wireless devices to which embodiments of the present disclosure are applied.

FIG. 25 illustrates wireless devices applicable to the present disclosure.

Referring to FIG. 25, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 24.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Hereinafter, a description will be given of instructions and/or operations controlled by the processor(s) 102 and stored in the memory(s) 104 of the first wireless device 100 according to an embodiment of the present disclosure.

While the following operations are described in the context of control operations of the processor(s) 102 from the perspective of the processor(s) 102, software code for performing the operations may be stored in the memory(s) 104.

The processor(s) 102 may be configured to control the transceiver(s) 106 to receive an SS/PBCH block and/or an additional signal for obtaining time information about the SS/PBCH block. The processor(s) 102 may be configured to obtain the time information about the received SS/PBCH block based on the SS/PBCH block and/or the additional signal. In this case, the processor(s) 102 may control the transceiver(s) 106 to receive the SS/PBCH block and then obtain the time information based on the SS/PBCH block according to Embodiments 1 to 3 described above.

Hereinafter, a description will be given of instructions and/or operations controlled by the processor(s) 202 and stored in the memory(s) 204 of the second wireless device 200 according to an embodiment of the present disclosure.

While the following operations are described in the context of control operations of the processor(s) 202 from the perspective of the processor(s) 202, software code for performing the operations may be stored in the memory(s) 204.

The processor(s) 202 may be configured to perform a CAP to transmit an SS/PBCH block in a U-band. The processor(s) 202 may be configured to generate the SS/PBCH block and/or an additional signal for acquiring time information about the SS/PBCH block based on a time when the CAP succeeds, i.e., based on the transmission timing of the SS/PBCH block.

The processor(s) 202 may be configured to control the transceiver(s) 206 to transmit the generated SS/PBCH block and/or additional signal. In this case, the processor(s) 20 may generate and transmit the SS/PBCH block according to Embodiments 1 to 3 described above.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 26:
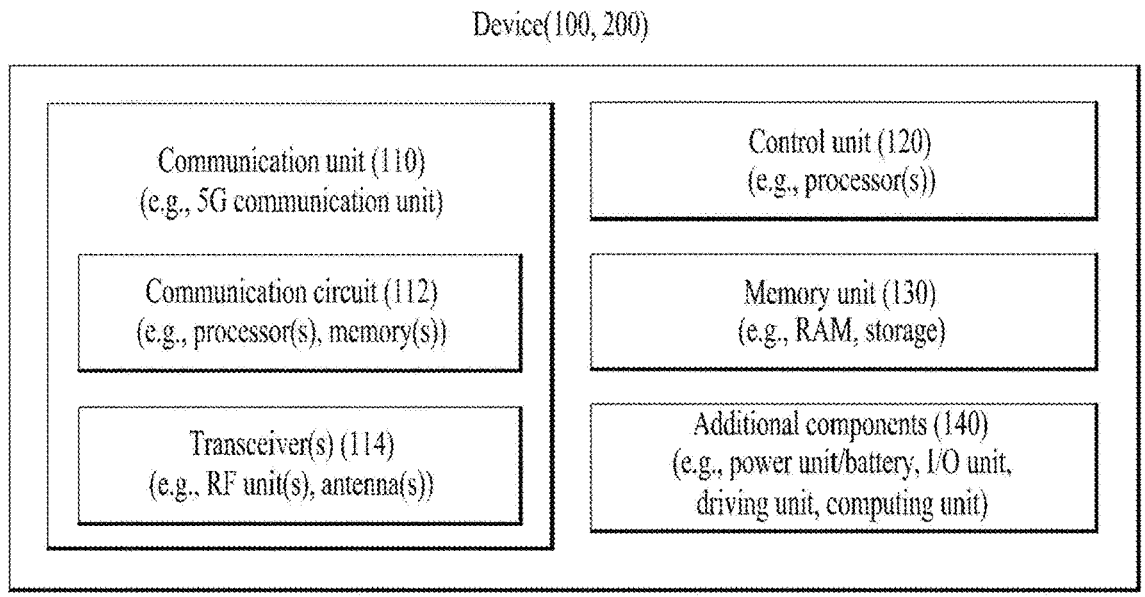

FIG. 26 illustrates another example of a wireless device applied to the present disclosure. The wireless device may be implemented in various forms according to a use case/service (refer to FIG. 24).

Referring to FIG. 26, wireless devices 100 and 200 may correspond to the wireless devices 100 and 200 of FIG. 23 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 29. For example, the transceiver(s) 114 may include the one or more transceivers 106 and 206 and/or the one or more antennas 108 and 208 of FIG. 29. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 22), the vehicles (100b-1 and 100b-2 of FIG. 22), the XR device (100c of FIG. 22), the hand-held device (100d of FIG. 22), the home appliance (100e of FIG. 22), the IoT device (100f of FIG. 22), a digital broadcasting terminal, a hologram device, a public safety device, an MTC device, a medical device, a FinTech device (or a finance device), a security device, a climate/environment device, the AI server/device (400 of FIG. 22), the BSs (200 of FIG. 22), a network node, or the like. The wireless device may be mobile or fixed according to a use case/service.

In FIG. 26, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

The implementation example of FIG. 26 will hereinafter be described with reference to the attached drawings.

Figure 27:
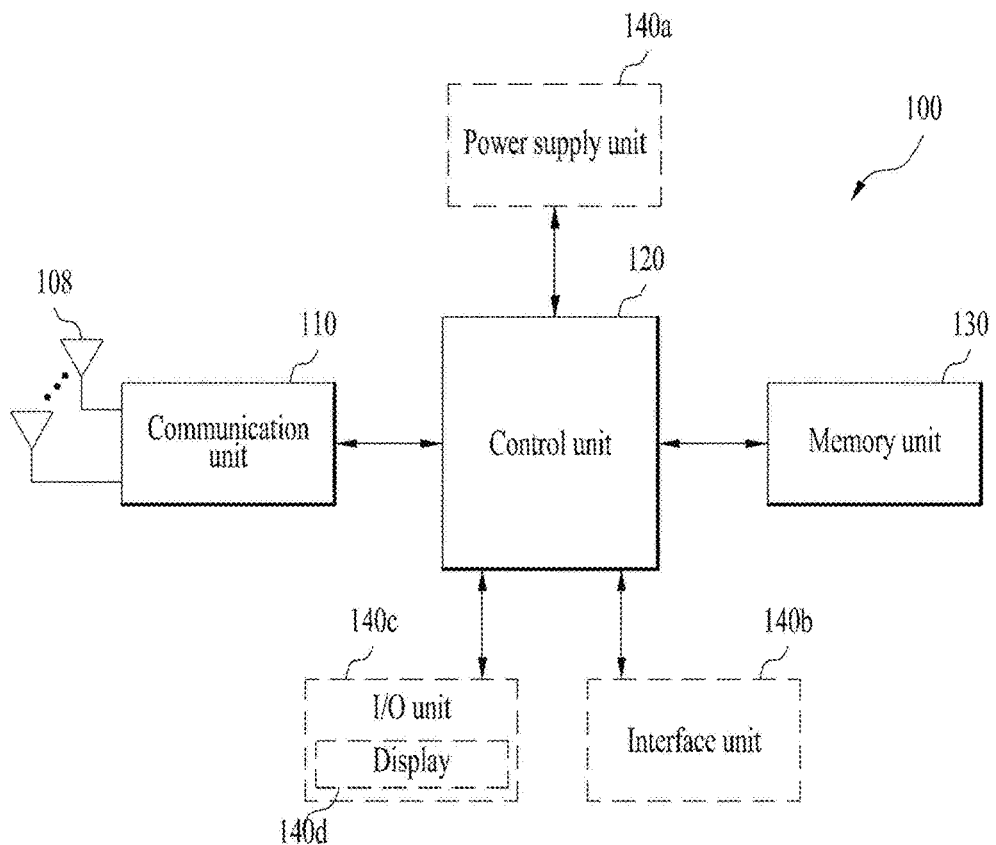

FIG. 27 is a block diagram illustrating a hand-held device 100 to which another embodiment of the present disclosure may be applied. The hand-held device may include a smartphone, a tablet (also called a smartpad), a wearable device (e.g., a smartwatch or smart glasses), and a portable computer (e.g., a laptop). The hand-held device 100 may be referred to as a mobile station (MS), a user terminal (UT), a mobile subscriber station (MSS), a subscriber station (SS), an advanced mobile station (AMS), or a wireless terminal (WT).

Referring to FIG. 27, the hand-held device 100 may include an antenna unit 108, a communication unit 110, a control unit 120, a memory unit 130, a power supply unit 140a, an interface unit 140b, and an input/output (I/O) unit 140c. The antenna unit 108 may be configured as a part of the communication unit 110. The blocks 110 to 130/140a to 140c correspond to the blocks 110 to 130/140 of FIG. 24, respectively.

The communication unit 110 may transmit and receive signals (e.g., data and control signals) to and from another wireless device and a BS. The control unit 120 may perform various operations by controlling elements of the hand-held device 100. The control unit 120 may include an application processor (AP). The memory unit 130 may store data/parameters/programs/code/commands required for operation of the hand-held device 100. Further, the memory unit 130 may store input/output data/information. The power supply unit 140a may supply power to the hand-held device 100, and include a wired/wireless charging circuit and a battery. The interface unit 140b may support connection between the hand-held device and other external devices. The interface unit 140b may include various ports (e.g., an audio I/O port and a video I/O port) for connection to external devices. The I/O unit 140c may receive or output video information/signal, audio information/signal, data, and/or user-input information. The I/O unit 140c may include a camera, a microphone, a user input unit, a display 140d, a speaker, and/or a haptic module.

For example, for data communication, the I/O unit 140c may acquire information/signals (e.g., touch, text, voice, images, and video) received from the user and store the acquired information/signals in the memory unit 130. The communication unit 110 may convert the information/signals into radio signals and transmit the radio signals directly to another device or to a BS. Further, the communication unit 110 may receive a radio signal from another device or a B S and then restore the received radio signal to original information/signal. The restored information/signal may be stored in the memory unit 130 and output in various forms (e.g., text, voice, an image, video, and a haptic effect) through the I/O unit 140c.

Figure 28:
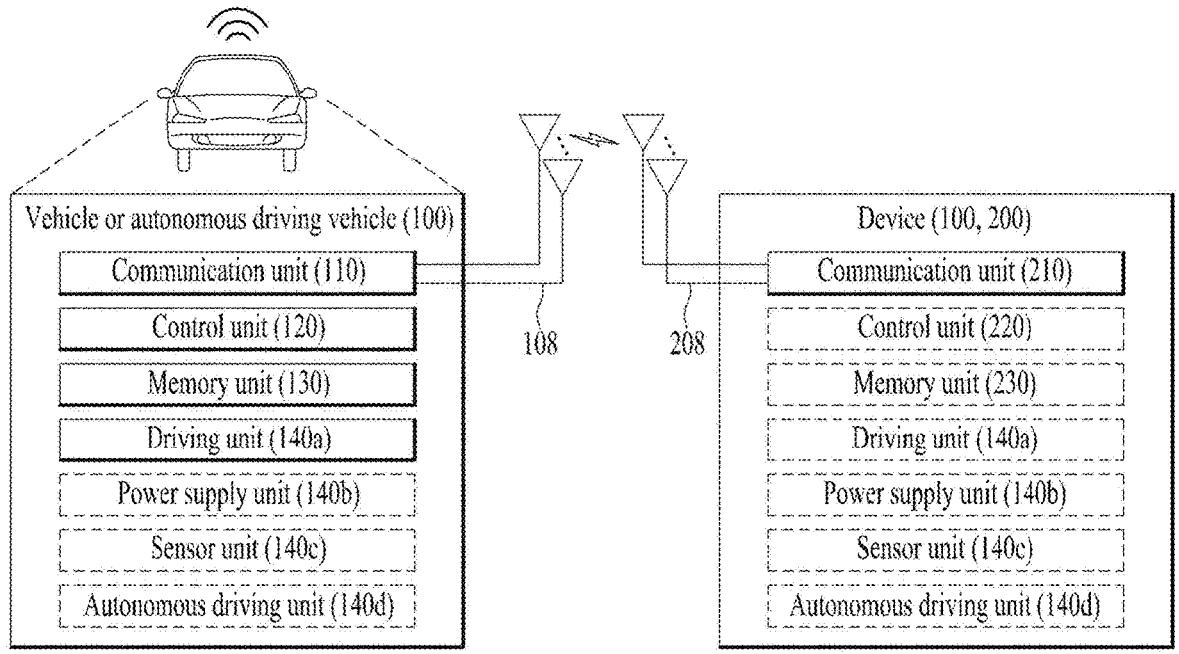

FIG. 28 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 28, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 24, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Figure 29:
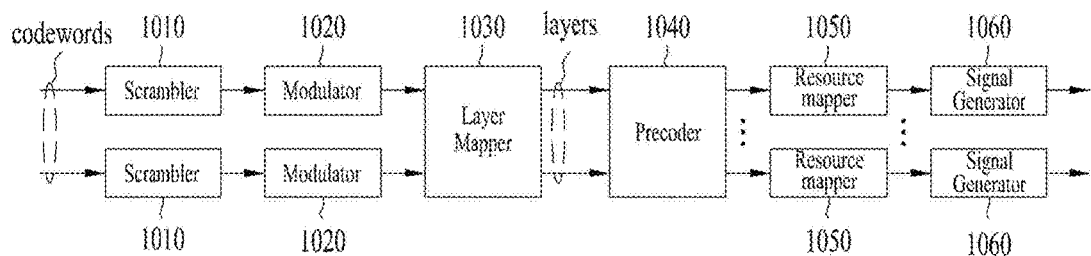
FIG. 29 illustrates an exemplary signal processing circuit to which embodiments of the present disclosure are applied.

FIG. 29 illustrates a signal processing circuit for transmission (Tx) signals.

Referring to FIG. 29, a signal processing circuit 1000 may include a scrambler 1010, a modulator 1020, a layer mapper 1030, a precoder 1040, a resource mapper 1050, and a signal generator 1060. The operations/functions shown in FIG. 29 may be performed by the processors 102 and 202 and/or the transceivers 106 and 206 shown in FIG. 25, without being limited thereto. Hardware elements shown in FIG. 29 may be implemented by the processors 102 and 202 and/or the transceivers 106 and 206 shown in FIG. 25. For example, the blocks 1010 to 1060 may be implemented by the processors 102 and 202. In addition, the blocks 1010 to 1050 may be implemented by the processors 102 and 202 shown in FIG. 23, and the block 1060 may be implemented by the transceivers 106 and 206 shown in FIG. 25.

The codeword may be converted into a radio signal (or a radio frequency (RF) signal) through the signal processing circuit 1000 shown in FIG. 28. Here, the codeword may be a coded bit sequence of an information block. The information block may include a transmission (Tx) block (e.g., UL-SCH transmission block, and/or DL-SCH transmission block). The radio signal may be transmitted through various physical channels (e.g., PUSCH, and PDSCH).

In more detail, the codeword may be converted into a bit sequence scrambled by the scrambler 1010. The scramble sequence used for such scrambling may be generated based on an initialization value, and the initialization value may include ID information of a wireless device, etc. The scrambled bit-sequence may be modulated into a modulated symbol sequence by the demodulator 1020. The modulation scheme may include pi/2-BPSK(pi/2-Binary Phase Shift Keying), m-PSK(m-Phase Shift Keying), m-QAM(m-Quadrature Amplitude Modulation), etc. The complex modulated symbol sequence may be mapped to one or more transmission (Tx) layers by the layer mapper 1030. Modulated symbols of the respective Tx layers may be mapped (precoded) to the corresponding antenna port(s) by the precoder 1040. The output value (z) of the precoder 1040 may be obtained by multiplying the output value (y) of the layer mapper 1030 by the (N×M) precoding matrix (W). In this case, N is the number of antenna ports, and M is the number of Tx layers. In this case, the precoder 1040 may perform precoding after transform precoding (e.g., DFT transform) is performed on the complex modulated symbols. In this case, the precoder 1040 may perform precoding without performing transform precoding.

The resource mapper 1050 may map the modulated symbols of the respective antenna ports to time-frequency resources. The time-frequency resources may include a plurality of symbols (e.g., CP-OFDMA symbol and DFT-s-OFDMA symbol) in the time domain, and may include a plurality of subcarriers in the frequency domain. The signal generator 1060 may generate radio signals from the mapped modulated symbols, and the generated radio signals may be transferred to other devices through the respective antennas. To this end, the signal generator 1060 may include an inverse fast Fourier transform (IFFT) module, a cyclic prefix (CP) inserter, a digital-to-analog converter (DAC), a frequency uplink converter, etc.

The signal processing steps for reception (Rx) signals in the wireless device may be arranged in the reverse order of the signal processing steps 1010 to 1060 shown in FIG. 25. For example, the wireless devices 100 and 200 (shown in FIG. 20) may receive radio signals from the outside through the antenna ports/transceivers. The received radio signals may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to the codeword after passing through the resource demapper process, the postcoding process, the demodulation process, and the descrambling process. The codeword may be restored to an original information block through decoding. Therefore, the signal processing circuit (not shown) for Rx signals may include a signal restorer, a resource demapper, a postcoder, a demodulator, a descrambler, and a decoder.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

While the method and apparatus for transmitting and receiving a DL signal have been described above in the context of being applied to a 5G New RAT system, they are also applicable to various wireless communication system as well as the 5G New RAT system.

What is claimed is:

1. A method of receiving a synchronization signal/physical broadcast channel (SS/PBCH) block by a user equipment (UE) in an unlicensed band, the method comprising:
receiving the SS/PBCH block including a synchronization signal (SS) and a physical broadcast channel (PBCH);
detecting an index of a demodulation reference signal (DMRS) sequence for the PBCH; and
obtaining an index of the SS/PBCH block based on the index of the DMRS sequence,
wherein a number of indices of SS/PBCH blocks is less than a number of indices of DMRS sequences, wherein the number of the indices of the DMRS sequences is 8,
wherein the indices of the SS/PBCH blocks are cyclically mapped to the indices of the DMRS sequences,
wherein the number of indices of the SS/PBCH blocks is equal to Q, wherein the Q is an interval between the SS/PBCH blocks where a quasi co-location (QCL) may be assumed,
wherein actually transmitted SS/PBCH blocks among the SS/PBCH blocks are indicated by a bitmap indicating the indices of the SS/PBCH blocks,
wherein, based on the Q, the bitmap of 8 bits is received, and only Q bits among the 8 bits of the bitmap are available to indicate the actually transmitted SS/PBCH blocks.

2. The method of claim 1, wherein after the indices of the SS/PBCH blocks and the indices of the DMRS sequences are cyclically mapped integer times to candidate positions in which transmission of the SS/PBCH blocks is allowed within a half frame, the indices of the SS/PBCH blocks and the indices of the DMRS sequences are cyclically mapped to remaining candidate positions by a number of the remaining candidate positions.

3. The method of claim 1, wherein a number of candidate positions in which transmission of the SS/PBCH block is allowed within a half frame is based on a subcarrier spacing.

4. The method of claim 1, wherein bits related to positions of DMRS sequence groups in which DMRS sequences mapped to candidate positions for transmission for the SS/PBCH block within a half frame are grouped by the number of the DMRS sequences is included in a payload of the PBCH.

5. The method of claim 4, wherein a number of the bits related to the positions of the DMRS sequence groups is determined based on a subcarrier spacing.

6. The method of claim 1, wherein the UE is configured to communicate with at least one of a UE other than the UE, a network, a base station, or an autonomous driving vehicle.

7. An apparatus configured to receive a synchronization signal/physical broadcast channel (SS/PBCH) block in an unlicensed band, the apparatus comprising:
at least one processor; and
at least one memory operably connected to the at least one processor and configured to store instructions that, when executed, cause the at least one processor to perform operations comprising:
receiving the SS/PBCH block including a synchronization signal (SS) and a physical broadcast channel (PBCH);
detecting an index of a demodulation reference signal (DMRS) sequence for the PBCH; and
obtaining an index of the SS/PBCH block based on the index of the DMRS sequence,
wherein a number of indices of SS/PBCH blocks is less than a number of indices of DMRS sequences, wherein the number of the indices of the DMRS sequences is 8,
wherein the indices of the SS/PBCH blocks are cyclically mapped to the indices of the DMRS sequences,
wherein the number of indices of the SS/PBCH blocks is equal to Q, wherein the Q is an interval between the SS/PBCH blocks where a quasi co-location (QCL) may be assumed,
wherein actually transmitted SS/PBCH blocks among the SS/PBCH blocks are indicated by a bitmap indicating the indices of the SS/PBCH blocks,
wherein, based on the Q, the bitmap of 8 bits is received, and only Q bits among the 8 bits of the bitmap are available to indicate the actually transmitted SS/PBCH blocks.

8. The apparatus of claim 7, wherein after the indices of the SS/PBCH blocks and the indices of the DMRS sequences are cyclically mapped integer times to candidate positions in which transmission of the SS/PBCH blocks is allowed within a half frame, the indices of the SS/PBCH blocks and the indices of the DMRS sequences are cyclically mapped to remaining candidate positions by a number of the remaining candidate positions.

9. The apparatus of claim 7, wherein a number of candidate positions in which transmission of the SS/PBCH block is allowed within a half frame is based on a subcarrier spacing.

10. The apparatus of claim 7, wherein bits related to positions of DMRS sequence groups in which DMRS sequences mapped to candidate positions for transmission for the SS/PBCH block within a half frame are grouped by the number of the DMRS sequences is included in a payload of the PBCH.

11. The apparatus of claim 10, wherein a number of the bits for the related to the positions of the DMRS sequence groups is determined based on a subcarrier spacing.

12. The apparatus of claim 7, wherein the apparatus is configured to communicate with a user equipment (UE), a network, a base station, or an autonomous driving vehicle.

13. A user equipment (UE) configured to receive a synchronization signal/physical broadcast channel (SS/PBCH) block in an unlicensed band,
at least one transceiver;
at least one processor; and
at least one memory operably connected to the at least one processor and configured to store instructions that, when executed, cause the at least one processor to perform operations comprising:
receiving the SS/PBCH block including a synchronization signal (SS) and a physical broadcast channel (PBCH) through the at least one transceiver;

detecting an index of a demodulation reference signal (DMRS) sequence for the PBCH; and obtaining an index of the SS/PBCH block based on the index of the DMRS sequence, wherein a number of indices of SS/PBCH blocks is less than a number of indices of DMRS sequences, wherein the number of the indices of the DMRS sequences is 8, wherein the indices of the SS/PBCH blocks are cyclically mapped to the indices of the DMRS sequences, wherein the number of indices of the SS/PBCH blocks is equal to Q, wherein the Q is an interval between the SS/PBCH blocks where a quasi co-location (QCL) may be assumed, wherein actually transmitted SS/PBCH blocks among the SS/PBCH blocks are indicated by a bitmap indicating the indices of the SS/PBCH blocks, wherein, based on the Q, the bitmap of 8 bits is received, and only Q bits among the 8 bits of the bitmap are available to indicate the actually transmitted SS/PBCH blocks.

* * * * *